US010596462B2

(12) United States Patent
Sato

(10) Patent No.: US 10,596,462 B2
(45) Date of Patent: Mar. 24, 2020

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventor: Shintaro Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 130 days.

(21) Appl. No.: 15/715,554

(22) Filed: Sep. 26, 2017

(65) Prior Publication Data

US 2018/0104583 A1 Apr. 19, 2018

(30) Foreign Application Priority Data

Oct. 17, 2016 (JP) ................. 2016-203595

(51) Int. Cl.
| | | |
|---|---|---|
| A63F 13/40 | (2014.01) | |
| A63F 13/211 | (2014.01) | |
| A63F 13/25 | (2014.01) | |
| A63F 13/428 | (2014.01) | |
| A63F 13/24 | (2014.01) | |
| A63F 13/30 | (2014.01) | |
| A63F 13/2145 | (2014.01) | |
| A63F 13/235 | (2014.01) | |

(52) U.S. Cl.
CPC ............ *A63F 13/40* (2014.09); *A63F 13/211* (2014.09); *A63F 13/24* (2014.09); *A63F 13/25* (2014.09); *A63F 13/30* (2014.09); *A63F 13/428* (2014.09); *A63F 13/2145* (2014.09); *A63F 13/235* (2014.09)

(58) Field of Classification Search
None
See application file for complete search history.

(56) References Cited

U.S. PATENT DOCUMENTS

2011/0118022 A1* 5/2011 Aronzon ................. A63F 13/42
463/37
2012/0302345 A1 11/2012 Shikata et al.
(Continued)

FOREIGN PATENT DOCUMENTS

| EP | 1 118 366 A1 | 7/2001 |
|---|---|---|
| JP | 2001-38057 | 2/2001 |
| JP | 2012-239762 | 12/2012 |

OTHER PUBLICATIONS

Office Action dated Dec. 13, 2018 issued in Japanese Application No. 2016-203595 (3 pgs.).

*Primary Examiner* — James S. McClellan
*Assistant Examiner* — Peter J Iannuzzi
(74) *Attorney, Agent, or Firm* — Nixon & Vanderhye, P.C.

(57) ABSTRACT

An example information processing system includes a main body apparatus, a handheld console controller, and a wireless controller. The handheld console controller is configured to be unified with the main body apparatus. The wireless controller is configured to be wirelessly connected to the main body apparatus. The main body apparatus sets one of the handheld console controller and the wireless controller, a predetermined button of which has been pressed down, to "active," and performs a game process based on operation data from the activate controller.

20 Claims, 17 Drawing Sheets

(56) References Cited

U.S. PATENT DOCUMENTS

| | | | |
|---|---|---|---|
| 2013/0324254 A1* | 12/2013 | Huang | G06F 3/016 |
| | | | 463/37 |
| 2015/0231498 A1* | 8/2015 | Hain | G06F 3/038 |
| | | | 463/36 |
| 2016/0183185 A1* | 6/2016 | Radhakrishnan | |
| | | | H04W 52/0209 |
| | | | 370/311 |
| 2017/0351355 A1* | 12/2017 | Hsieh | G06F 3/041 |
| 2018/0001188 A1* | 1/2018 | Patel | A63F 13/428 |

* cited by examiner

F I G. 6
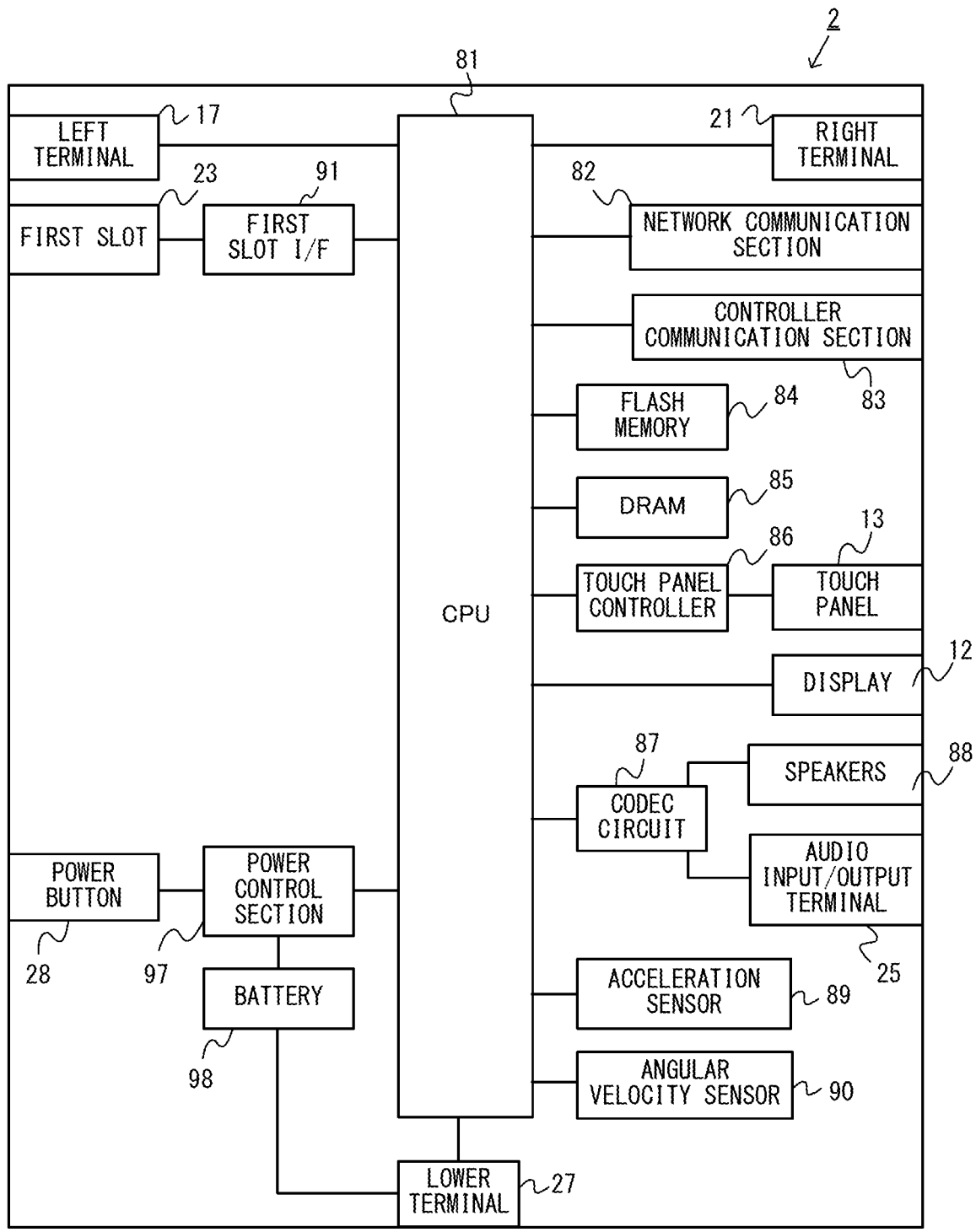

FIG. 11
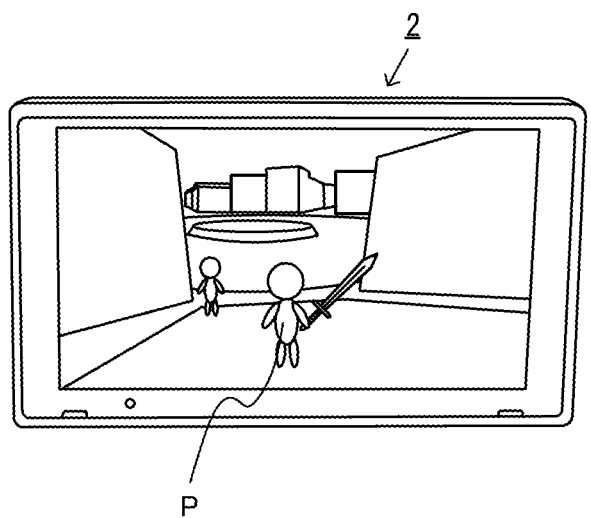
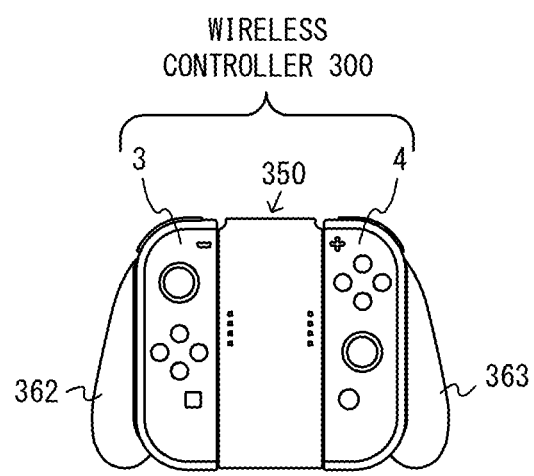

FIG. 13
HANDHELD CONSOLE CONTROLLER 100
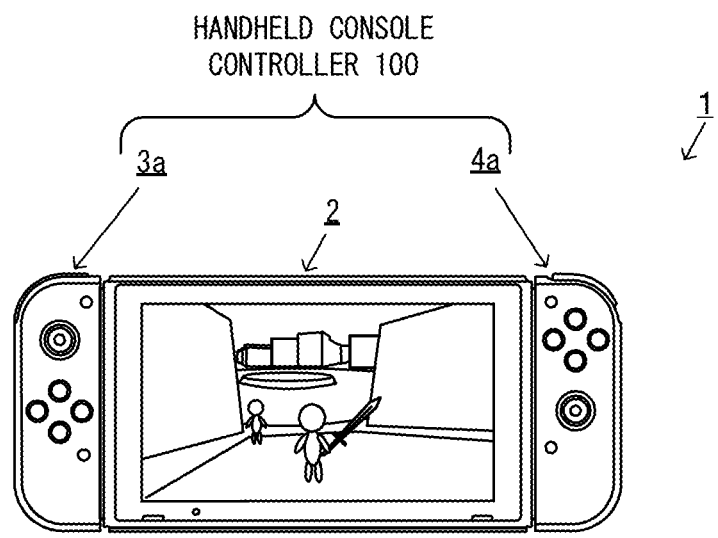
WIRELESS CONTROLLER 500
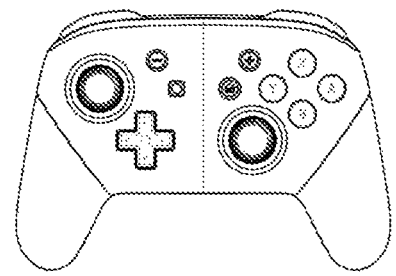

F I G. 1 8
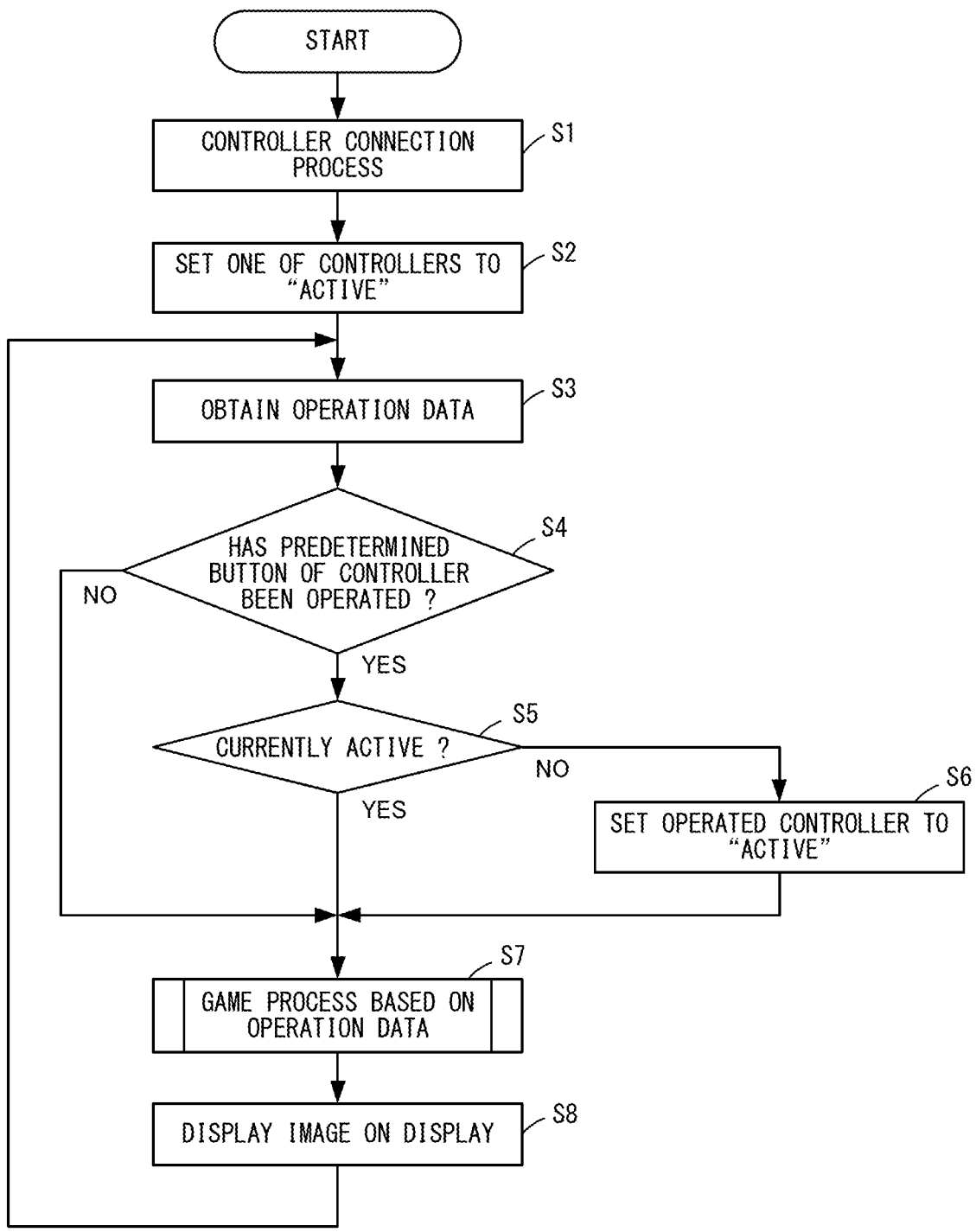

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2016-203595, filed Oct. 17, 2016, is incorporated herein by reference.

FIELD

The present embodiment relates to information processing systems, information processing apparatuses, information processing programs, and information processing methods.

BACKGROUND AND SUMMARY

Information processing systems in which operations can be performed using various operation apparatuses are commonly used. For example, there is an information processing system in which a game is played by a plurality of users using respective operation apparatuses.

However, there is room for improvement of the user-friendliness of such an information processing system in which various operation apparatuses can be used.

With this in mind, it is an object of this embodiment to provide an information processing system in which various operation apparatuses can be used, and which is user-friendly.

To achieve the object, this embodiment has the following features.

An information processing system according to an example of this embodiment includes: an information processing apparatus including a display section; a first operation apparatus configured to wirelessly connect to the information processing apparatus, and having a first operation section; and a second operation section configured to be unified with the information processing apparatus. The information processing apparatus includes an information processing section configured to perform an information process based on an operation performed on one of the first operation section and the second operation section that has been most recently operated by a user.

According to the above feature, an operation performed on one of the first operation section and the second operation section that has been most recently operated can be used in an information process, and the operation sections can be seamlessly switched.

Further, the information processing section may obtain operation data from the first operation section and operation data from the second operation section, and perform the information process based on the obtained operation data from one of the first operation section and the second operation section that has been most recently operated by the user.

According to the above feature, operation data can be obtained from both of the operation sections, and the operation data from one of the operation section that has been most recently operated by the user can be used in an information process.

Further, the first operation section and the second operation section may each have a movable operation section configured to be operated by an operation performed by the user. The information processing system may further include: a first sensor configured to output data indicating a state of the first operation apparatus; and a second sensor configured to output data indicating a state of the information processing apparatus. The information processing section may execute: determining which of an operation performed on the movable operation section of the first operation section and an operation performed on the movable operation section of the second operation section has been most recently performed; when the operation performed on the movable operation section of the first operation section has been most recently performed, performing the information process based on an operation performed on the first operation section and an output of the first sensor; and when the operation performed on the movable operation section of the second operation section has been most recently performed, performing the information process based on an operation performed on the second operation section and an output of the second sensor.

According to the above feature, the first operation section and the second operation section can be switched by an operation performed on a movable operation section, and an information process can be performed based on an operation performed on the operation section selected by the switching, and a sensor that outputs data indicating a state of that operation section. For example, a sensor that outputs a state of an apparatus always output data indicating the state of the apparatus, and therefore, it may be difficult to determine whether or not the user is actually using the apparatus, based on data from the sensor. However, it is easy to determine which of the apparatuses is being used, based on the presence or absence of an operation performed on a movable operation section. Therefore, an information process can be performed based on an operation performed on an apparatus that is actually being used by the user, and an output of a sensor that outputs data indicating a state of that apparatus.

Further, the first operation section and the second operation section may each include, as the movable operation section, a button configured to be pressed down by the user, and a directional operation section configured to be tilted or slid in a predetermined direction by the user. The information processing section may execute: determining which of an operation performed on the button of the first operation section and an operation performed on the button of the second operation section has been most recently performed; when the operation performed on the button of the first operation section has been most recently performed, performing the information process based on an operation performed on the first operation section and an output of the first sensor; and when the operation performed on the button of the second operation section has been most recently performed, performing the information process based on an operation performed on the second operation section and an output of the second sensor.

According to the above feature, the first operation section and the second operation section each including a button configured to be pressed down by the user, and a directional operation section configured to be tilted or slid in a predetermined direction by the user, can be switched in accordance with an operation performed on the button.

Further, the first sensor and the second sensor may each include an inertial sensor. The first operation section and the second operation section may each include at least one of a button configured to be pressed down by the user, a directional operation section configured to be tilted or slid in a predetermined direction by the user, and a touch panel.

According to the above feature, an information process can be performed based on data from the inertial sensor and an operation performed on various operation sections.

Further, the second operation section may be provided in a second operation apparatus attachable to and detachable from the information processing apparatus. When the second operation apparatus is attached to the information processing apparatus, the information processing apparatus is unified with the second operation apparatus.

According to the above feature, the second operation apparatus can be attached to or detached from the information processing apparatus.

Further, the first operation apparatus and the second operation apparatus may both be attachable to and detachable from the information processing apparatus, and when not attached to the information processing apparatus, wirelessly communicate with the information processing apparatus.

According to the above feature, an operation can be performed using the first operation apparatus and the second operation apparatus attachable to and detachable from the information processing apparatus.

Further, the first operation apparatus and the second operation apparatus may each include a pair of a right operation unit and a left operation unit, the right operation unit being attachable to and detachable from a right surface of the information processing apparatus and configured to perform wireless communication, and the left operation unit being attachable to and detachable from a left surface of the information processing apparatus and configured to perform wireless communication.

According to the above feature, the first operation apparatus and the second operation apparatus can each be configured to include a left unit and a right unit.

Further, the first sensor may be provided in the first operation apparatus, and the second sensor may be provided in the information processing apparatus.

According to the above feature, a state of the first operation apparatus can be detected using the first sensor provided in the first operation apparatus, and a state of the information processing apparatus can be detected using the second sensor provided in the information processing apparatus.

Further, the information processing apparatus, the first operation apparatus, and the second operation apparatus may each include an inertial sensor. The first sensor may be the inertial sensor included in the first operation apparatus, and the second sensor may be the inertial sensor included in the information processing apparatus.

According to the above feature, the inertial sensors can be used to detect states of the apparatuses.

Further, the information processing system may further include a third operation apparatus configured to wirelessly connect to the information processing apparatus. When the first operation apparatus and the third operation apparatus are both wirelessly connected to the information processing apparatus, the information processing section may perform a selection step of allowing the user to select one of the first operation apparatus, the second operation apparatus, and the third operation apparatus that is to be used, and perform an information process based on an operation performed on the operation apparatus selected in the selection step.

According to the above feature, the user is allowed to select an operation apparatus.

Further, the information processing section may perform a disconnection step of disconnecting a wireless connection to one of the first operation apparatus and the third operation apparatus that has not been selected in the selection step.

According to the above feature, a wireless connection to an operation apparatuses that has not been selected by the user can be disconnected, so that power consumption can be reduced.

Further, an another example of this embodiment may be an information processing apparatus included in the information processing system, an information processing program to be executed in the information processing apparatus, and an information processing method for use in the information processing system.

According to this embodiment, an information processing system in which a first operation section and a second operation section can be switched, and which is therefore convenient for the user, can be provided.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 6 is an example non-limiting block diagram showing the internal configuration of the main body apparatus 2;

FIG. 11 is an example non-limiting diagram showing a situation where a game is played using the left controller 3 and the right controller 4 as detached from the main body apparatus 2;

FIG. 13 is an example non-limiting diagram showing a situation where a single wireless controller 500 is connected to the main body apparatus 2 instead of the wireless controller 300 including the left controller 3 and the right controller 4;

FIG. 18 is an example non-limiting flowchart showing an example of a process performed in the main body apparatus 2;

DETAILED DESCRIPTION OF NON-LIMITING EXAMPLE EMBODIMENTS

An information processing system according to an example of an exemplary embodiment is described below. An example of an information processing system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the information processing system 1 can be used as a unified apparatus obtained by attaching each of the left controller 3 and the right controller 4 to the main body apparatus 2. Further, in the information processing system 1, the main body apparatus 2, the left controller 3, and the right controller 4 can also be used as separate bodies (see FIG. 2). Further, the information processing system 1 is used in the following forms: an image is displayed on the main body apparatus 2; and an image is displayed on another display apparatus (e.g., a stationary monitor), such as a television or the like. In the former forms, the information processing system 1 can be used as a handheld apparatus (e.g., a handheld game console). Further, in the latter form, the information processing system 1 can be used as a stationary apparatus (e.g., a stationary game console). It should be noted that the information processing system 1 of this exemplary embodiment can include a wireless controller which is not attached to the main body apparatus 2 (see FIG. 12).

(Description of Main Body Apparatus, Left Controller, and Right Controller)

Figure 1:
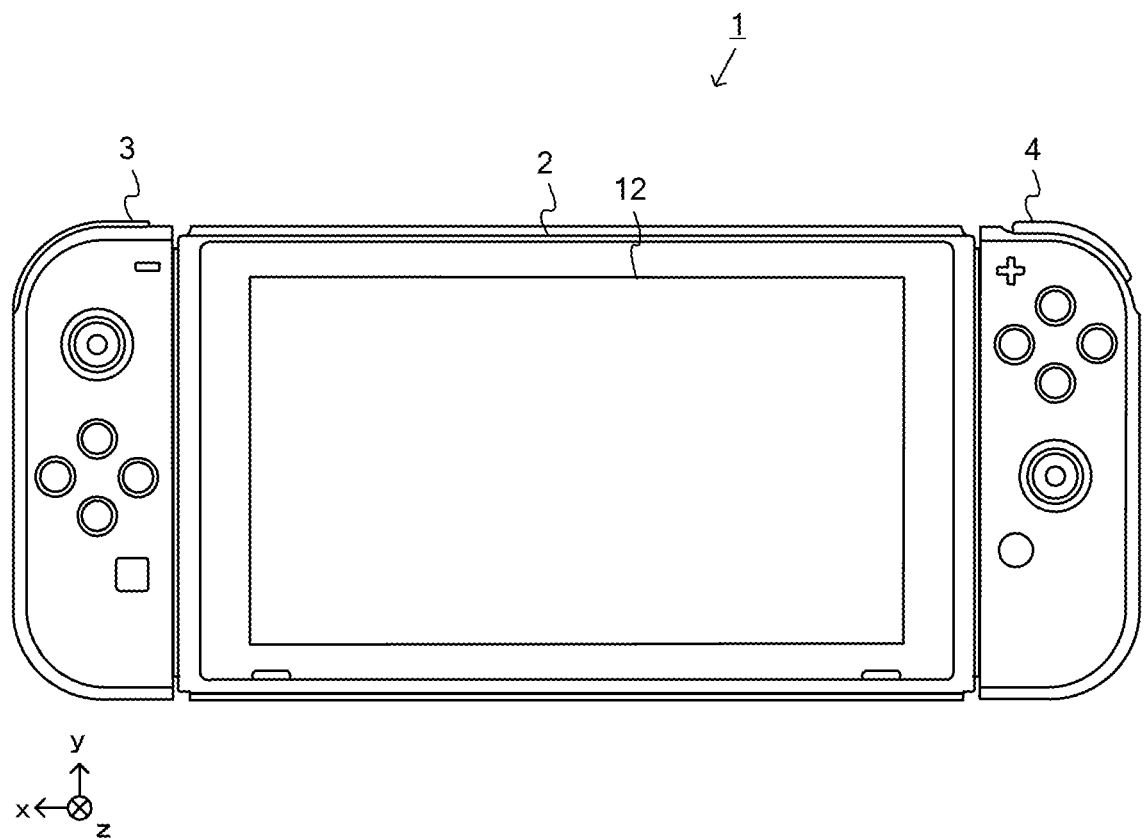
FIG. 1 is an example non-limiting diagram showing a state where a left controller 3 and a right controller 4 are attached to a main body apparatus 2.

FIG. 1 is an example non-limiting diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., a game process) in the information processing system 1. The main body apparatus 2 includes a display 12. Each of the left controller 3 and the right controller 4 is an apparatus including operation sections with which a user provides inputs.

Figure 2:
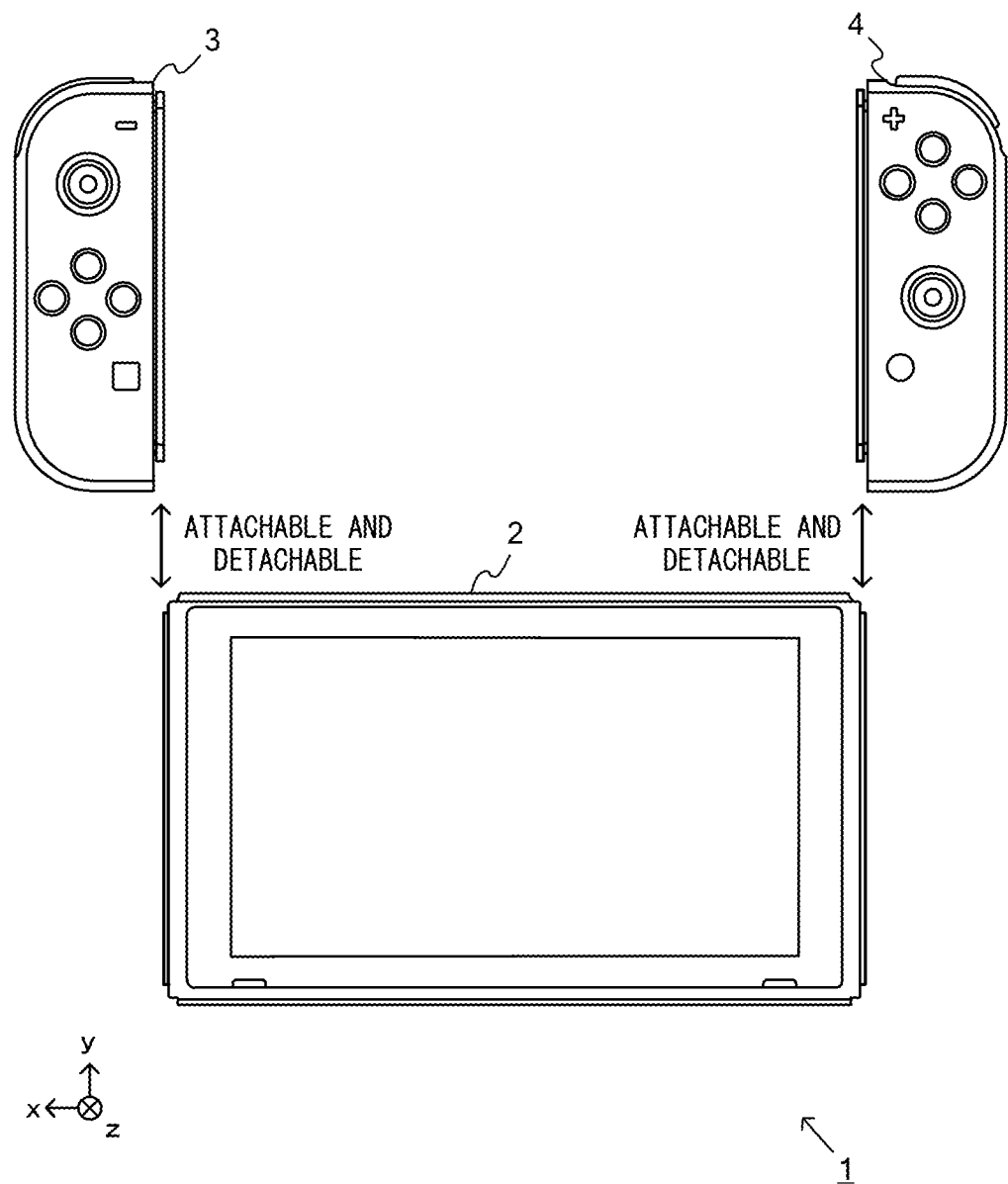
FIG. 2 is an example non-limiting diagram showing a state where each of the left controller 3 and the right controller 4 is detached from the main body apparatus 2.

FIG. 2 is an example non-limiting diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. The left controller 3 can be attached to a left side surface (a side surface in the positive direction of the x-axis shown in FIG. 1 from the center of the main body apparatus 2) of the main body apparatus 2. The left controller 3 is attachable to and detachable from the main body apparatus 2 by being slid along the left side surface of the main body apparatus 2 in the y-axis direction shown in FIG. 1. Further, the right controller 4 can be attached to a right side surface (a side surface in the negative direction of the x-axis shown in FIG. 1 from the center of the main body apparatus 2) of the main body apparatus 2. The right controller 4 is attachable to and detachable from the main body apparatus 2 by being slid along the right side surface of the main body apparatus 2 in the y-axis direction shown in FIG. 1. It should be noted that hereinafter, the left controller 3 and the right controller 4 are hereinafter occasionally collectively referred to as "controllers."

Figure 3:
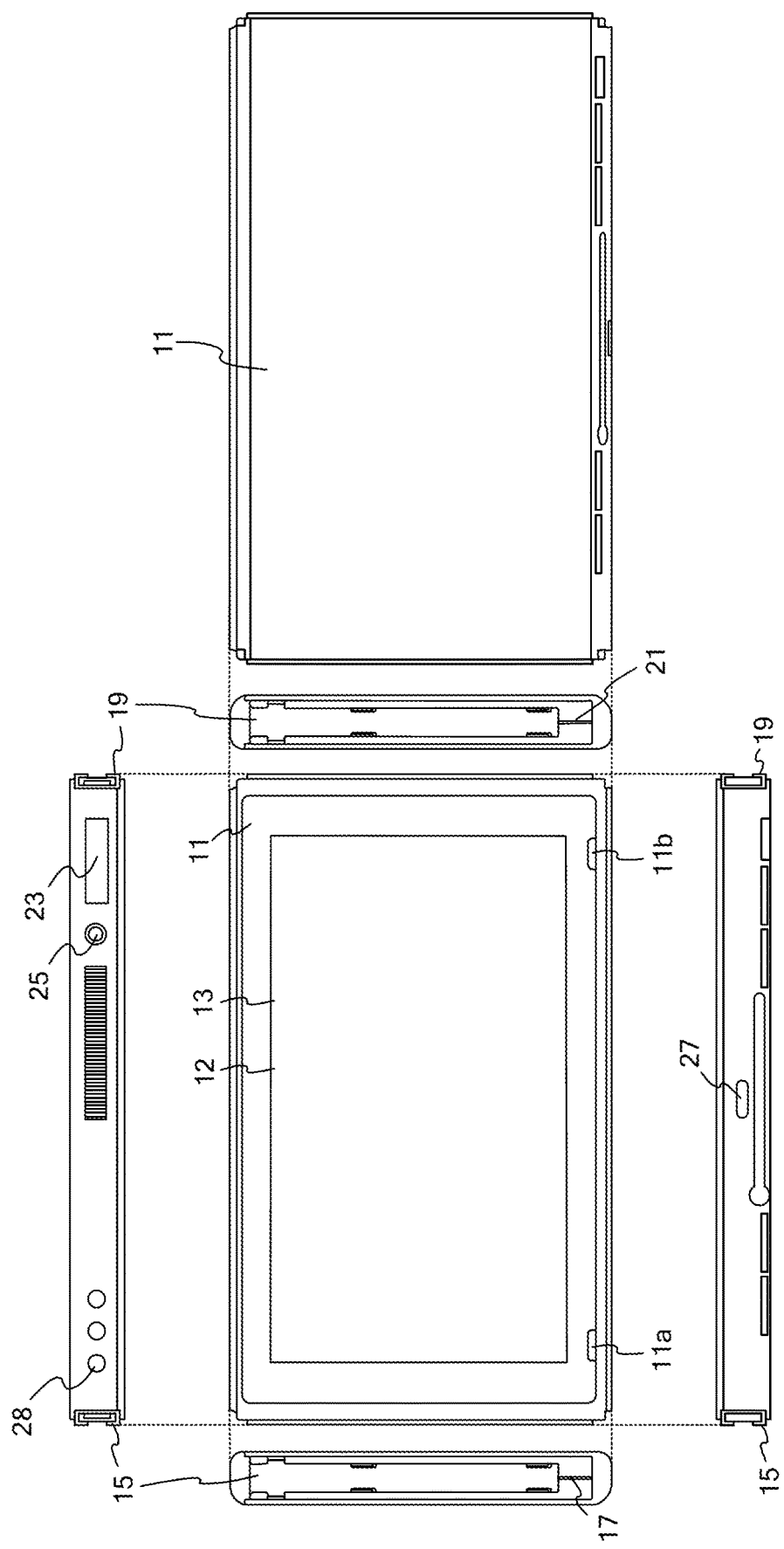
FIG. 3 is an example non-limiting diagram having six orthogonal views showing the main body apparatus 2.

FIG. 3 is an example non-limiting diagram having six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

As shown in FIG. 3, the main body apparatus 2 includes a left rail member 15 on the left side surface of the housing 11. The left rail member 15 is a member for detachably attaching the left controller 3 to the main body apparatus 2. The left rail member 15 is provided on the left side surface of the housing 11, extending in the vertical direction (the y-axis direction). The left rail member 15 is so shaped as to engage with a slider (i.e., a slider 40 shown in FIG. 4) of the left controller 3. The left rail member 15 and the slider 40 form a slider mechanism. The slider mechanism allows the left controller 3 to be slid and detachably attached to the main body apparatus 2. Further, a right rail member 19 is provided on the right side surface of the housing 11, which has a configuration similar to that of the left rail member 15.

Further, the main body apparatus 2 includes a left terminal 17. The left terminal 17 is a terminal for allowing the main body apparatus 2 to perform wired communication with the left controller 3. The left terminal 17 is provided at a position where the left terminal 17 is made contact with a terminal (a terminal 42 shown in FIG. 4) of the left controller 3 when the left controller 3 is attached to the main body apparatus 2. Further, the main body apparatus 2 includes a right terminal 21. The right terminal 21 is a terminal for allowing the main body apparatus 2 to perform wired communication with the right controller 4. The right terminal 21 is provided at a position where the right terminal 21 is made contact with a terminal (a terminal 64 shown in FIG. 5) of the right controller 4 when the right controller 4 is attached to the main body apparatus 2.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) to the information system 1 and an information processing apparatus of the same type as the information system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28. As shown in FIG. 3, the power button 28 is provided on the upper side surface of the housing 11. The power button 28 is a button for turning the main body apparatus 2 on/off.

The main body apparatus 2 includes an audio input/output terminal (specifically, an earphone jack) 25. That is, a microphone or an earphone can be attached to the audio input/output terminal 25 of the main body apparatus 2. As shown in FIG. 3, the audio input/output terminal 25 is provided on the upper side surface of the housing 11.

The main body apparatus 2 includes a lower terminal 27. The lower terminal 27 is a terminal for allowing the main body apparatus 2 to communicate with a cradle. As shown in FIG. 3, the lower terminal 27 is provided on a lower side surface of the housing 11. When the main body apparatus 2 is mounted on the cradle, the lower terminal 27 is connected to a terminal of the cradle. In this example, the lower terminal 27 is a USB connector (more specifically, a female connector). Only the main body apparatus 2 from which the left controller 3 and the right controller 4 are detached can be mounted on the cradle. Further, in still another example, a unified apparatus obtained by attaching the left controller 3 and the right controller 4 to the main body apparatus 2 can be mounted on the cradle. Further, the cradle can communicate with a stationary monitor which is an example of an external display apparatus (e.g., a stationary television) that is separated from the main body apparatus 2 (through wired communication or wireless communication). When the unified apparatus or the main body apparatus 2 alone is mounted on the cradle, the information processing system 1 can display, on the stationary monitor, an image generated by and output from the main body apparatus 2. Further, in this example, the cradle has the function of charging the unified apparatus or the main body apparatus 2 alone mounted on the cradle. Further, the cradle also serves as a hub device (specifically, a USB hub).

Each of the above components (specifically, buttons, slots, terminals, etc.) provided in or on the housing 11 has any suitable shape, number, and arrangement. For example, in another example, some of the power button 28 and the slot 23 may be provided on another side surface or a back surface of the housing 11. Further, in another example, the main body apparatus 2 may not include some of the above components.

Figure 4:
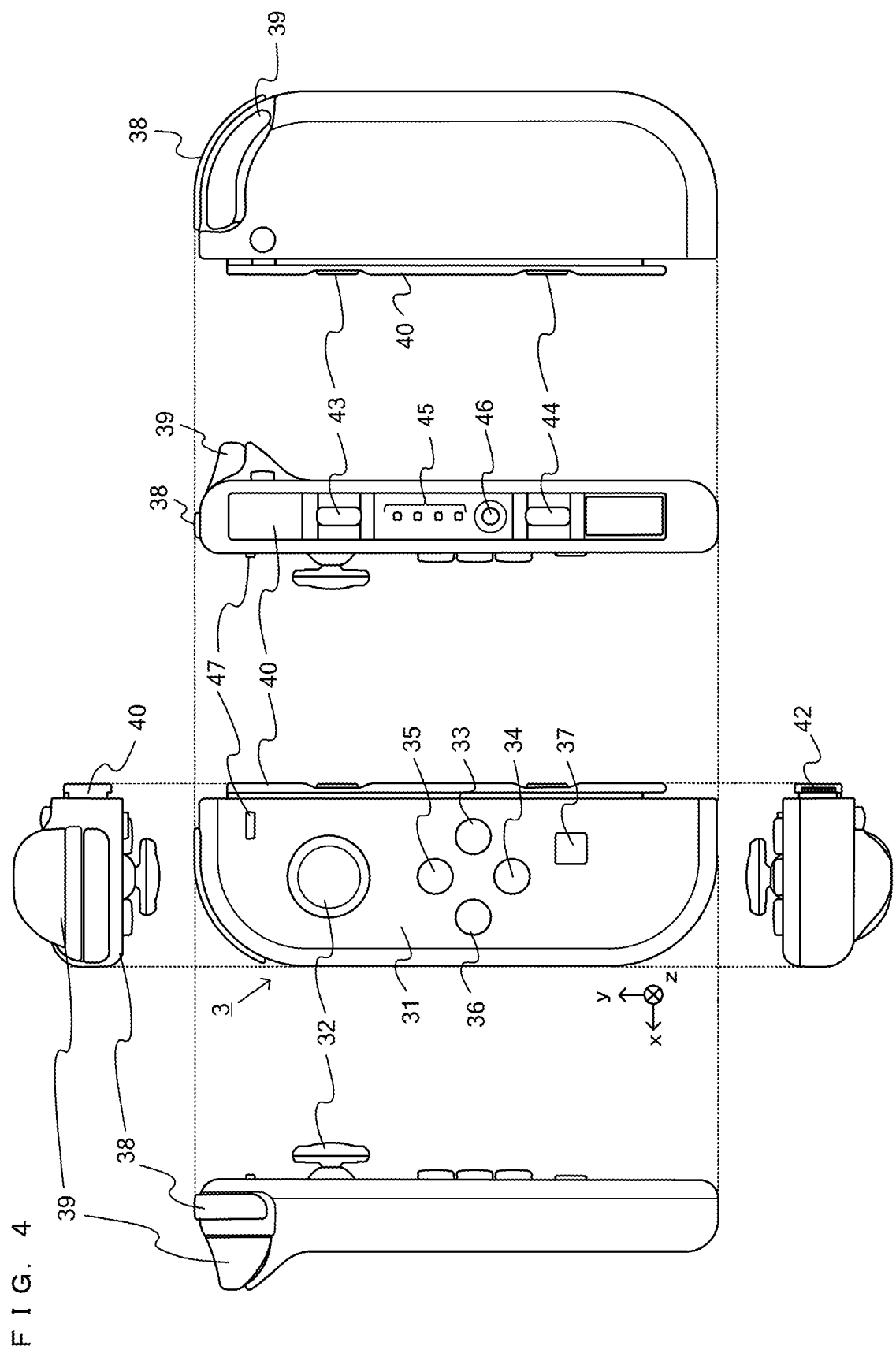
FIG. 4 is an example non-limiting diagram having six orthogonal views showing the left controller 3.

FIG. 4 is an example non-limiting diagram having six orthogonal views showing an example of the left controller 3. As shown in FIG. 4, the left controller 3 includes a housing 31. In this example, the housing 31 is an approximately plate-shaped housing. Further, a main surface (in other words, a surface on a front side, i.e., a surface in the negative direction of the z-axis shown in FIG. 1 from the center of the main body apparatus 2) has a generally rectangular shape. Further, in this example, the housing 31 is longer than it is wide, i.e., is shaped to be long in a vertical direction (i.e., the y-axis direction shown in FIG. 1). In the state where the left controller 3 is detached from the main body apparatus 2, the left controller 3 can also be held in the orientation in which the left controller 3 is vertically long, i.e., in its portrait orientation. The housing 31 has such a shape and a size that when held in its portrait orientation, the housing 31 can be held by one hand, particularly the left hand. Further, the left controller 3 can also be held in the orientation in which the left controller 3 is horizontally long, i.e., in its landscape orientation. When held in its landscape orientation, the left controller 3 may be held by both hands. It should be noted that the housing 31 may have any suitable shape. In another example, the housing 31 may not be an approximately plate-shaped housing. Further, the housing 31 may not have a rectangular shape. The housing 31 may have a semicircular shape or the like, for example. Further, the housing 31 may not be longer than it is wide.

A vertical length of the housing 31 is substantially the same as that of the housing 11 of the main body apparatus 2. Further, a thickness (i.e., a length in the fore-and-aft direction, or a length in the z-axis direction shown in FIG. 1) of the housing 31 is substantially the same as that of the housing 11 of the main body apparatus 2. Therefore, when the left controller 3 is attached to the main body apparatus 2 (see FIG. 1), the user can hold the main body apparatus 2 and the left controller 3, feeling as if the user held a single apparatus.

The left controller 3 includes an analog stick 32. As shown in FIG. 4, the analog stick 32 is provided on a main surface of the housing 31. The analog stick 32 can be used as a direction input section with which a direction can be input. The analog stick 32 has a stick member that can be tilted in all directions parallel to the main surface of the housing 31 (i.e., 360 degrees around the center, including vertical directions, horizontal directions, and diagonal directions). The user tilts the stick member and thereby can input a direction corresponding to the direction of the tilt (and can input a magnitude corresponding to the angle of the tilt). It should be noted that the left controller 3 may include a directional pad, a slide stick that allows a slide input, or the like as the direction input section, instead of the analog stick. Further, in this example, it is possible to provide an input by pressing down the stick member (in a direction perpendicular to the housing 31). That is, the analog stick 32 is an input section that can be used to provide: an input having a direction and a magnitude corresponding to the tilt direction and the tilt amount, respectively, of the stick member; and an input by the stick member being pressed down.

The left controller 3 includes four operation buttons 33 to 36 (specifically, a "right" button 33, a "down" button 34, an "up" button 35, and a "left" button 36). As shown in FIG. 4, the four operation buttons 33 to 36 are provided on the main surface of the housing 31 below the analog stick 32. The operation buttons 33 to 36 are used to give instructions related to various programs (e.g., an OS program and application programs) executed by the main body apparatus 2. Further, the left controller 3 has a record button 37. Further, the left controller 3 has a "−" (minus) button 47.

When the left controller 3 is attached to the main body apparatus 2, each operation section (specifically, the analog stick 32 and the buttons 33 to 37 and 47) provided on the main surface of the left controller 3 is operated using the thumb of the left hand of the user holding the unified apparatus, for example. Further, when the left controller 3 as detached from the main body apparatus 2 is being held by both hands in its horizontal orientation, the operation sections are operated using the thumbs of both hands of the user holding the left controller 3, for example. Specifically, in this case, the analog stick 32 is operated using the thumb of the left hand of the user, and the operation buttons 33 to 36 are operated using the thumb of the right hand of the user.

The left controller 3 includes a first L-button 38. Further, the left controller 3 includes a ZL-button 39. These operation buttons 38 and 39 are used to give instructions related to various programs executed by the main body apparatus 2, as with the operation buttons 33 to 36. As shown in FIG. 4, the first L-button 38 is provided on an upper left portion of the side surface of the housing 31. Further, the ZL-button 39 is provided on an upper left portion (strictly speaking, an upper left portion of the housing 31 as viewed from the front side) extending from the side surface to the back surface of the housing 31. In other words, the ZL-button 39 is provided behind the first L-button 38 (in the positive direction of the z-axis shown in FIG. 1 from the center of the left controller 3). When the left controller 3 is attached to the main body apparatus 2, the first L-button 38 and the ZL-button 39 are provided on an upper left portion of the unified apparatus.

The left controller 3 includes the slider 40. As shown in FIG. 4, the slider 40 is provided on the right side surface of the housing 31, extending vertically. The slider 40 is so shaped as to engage with the left rail member 15 (more specifically, a groove of the left rail member 15) of the main body apparatus 2.

Further, the left controller 3 includes the terminal 42 for allowing the left controller 3 to perform wired communication with the main body apparatus 2. The terminal 42 is provided at a position where, when the left controller 3 is attached to the main body apparatus 2, the left controller 3 is made contact with the left terminal 17 (FIG. 3) of the main body apparatus 2.

Further, the left controller 3 includes a second L-button 43 and a second R-button 44. These buttons 43 and 44 are used to give instructions related to various programs executed by the main body apparatus 2, as with the operation buttons 33 to 36. As shown in FIG. 4, the second L-button 43 and the second R-button 44 are provided on the surface to which the slider 40 is to be attached.

The left controller 3 includes a notification LED 45. The notification LED 45 is a notification section for notifying the user of predetermined information. The notification LED 45 notifies the user of any suitable information.

The left controller 3 includes a pairing button 46. In this example, the pairing button 46 is used to give an instruction to perform a setting (also referred to as "pairing") process for wireless communication between the left controller 3 and the main body apparatus 2, and an instruction to perform a process for resetting the left controller 3.

Figure 5:
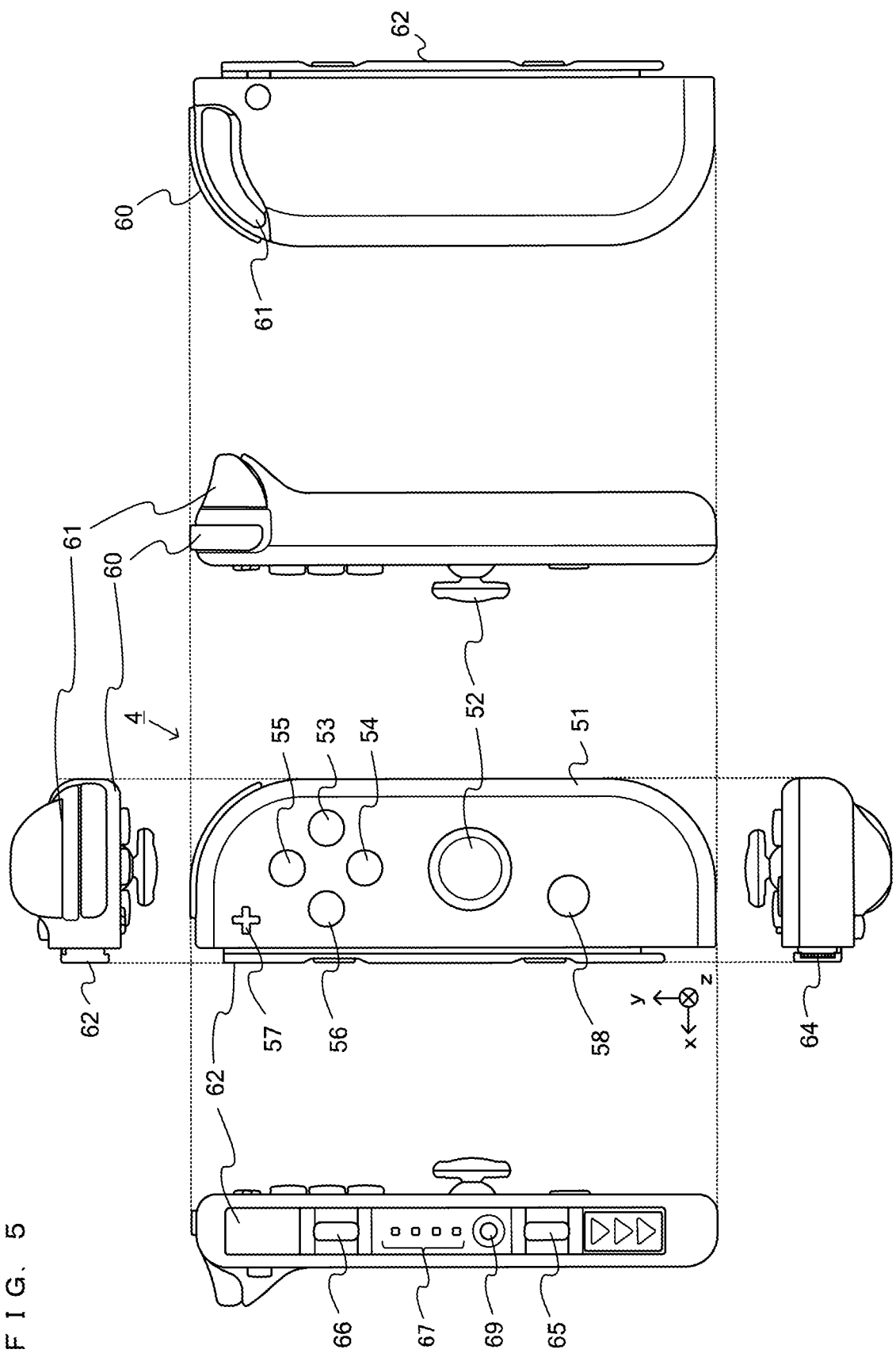
FIG. 5 is an example non-limiting diagram having six orthogonal views showing the right controller 4.

FIG. 5 is an example non-limiting diagram having six orthogonal views showing an example of the right controller 4. As shown in FIG. 5, the right controller 4 includes a housing 51. In this example, the housing 51 is an approximately plate-shaped housing. Further, a main surface (in other words, a surface on a front side, i.e., a surface in the negative direction of the z-axis shown in FIG. 1 from the center of the right controller 4) has a generally rectangular shape. Further, in this example, the housing 51 is longer than it is wide, i.e., is shaped to be long in a vertical direction (i.e., the y-axis direction shown in FIG. 1). In the state where the right controller 4 is detached from the main body apparatus 2, the right controller 4 can also be held in the orientation in which the left controller 3 is vertically long, i.e., in its portrait orientation. The housing 51 has such a shape and a size that when held in its portrait orientation, the housing 51 can be held by one hand, particularly the right hand. Further, the right controller 4 can also be held in the orientation in which the left controller 3 is horizontally long, i.e., in its landscape orientation. When held in its landscape orientation, the right controller 4 may be held by both hands.

A vertical length of the housing 51 is substantially the same as that of the housing 11 of the main body apparatus 2, like the housing 31 of the left controller 3. Further, a thickness of the housing 51 is substantially the same as that of the housing 11 of the main body apparatus 2. Therefore, when the right controller 4 is attached to the main body apparatus 2 (see FIG. 1), the user can hold the main body apparatus 2 and the right controller 4, feeling as if the user held a single apparatus.

As with the left controller 3, the right controller 4 includes an analog stick 52 as a direction input section. In this example, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58.

When the right controller 4 is attached to the main body apparatus 2, each operation section (specifically, the analog stick 52 and the buttons 53 to 58) provided on the main surface of the right controller 4 is operated using the thumb of the right hand of the user holding the unified apparatus, for example. Further, when the right controller 4 as detached from the main body apparatus 2 is being held by both hands in its horizontal orientation, the operation sections are operated using the thumbs of both hands of the user holding the right controller 4, for example. Specifically, in this case, the analog stick 52 is operated using the thumb of the left hand of the user, and the operation buttons 53 to 56 are operated using the thumb of the right hand of the user.

The right controller 4 includes a first R-button 60. Further, the right controller 4 includes a ZR-button 61. As shown in FIG. 5, the first R-button 60 is provided on an upper right portion of the side surface of the housing 51. Further, the ZR-button 61 is provided on an upper right portion (strictly speaking, an upper right portion of the housing 51 as viewed from the front side) extending from the side surface to the back surface of the housing 51. In other words, the ZR-button 61 is provided behind the first R-button 60 (in the positive direction of the z-axis shown in FIG. 1 from the center of the right controller 4).

The right controller 4 includes a slider mechanism similar to the left controller 3. That is, the right controller 4 includes a slider 62.

Further, the right controller 4 includes a terminal 64 for allowing the right controller 4 to perform wired communication with the main body apparatus 2. The terminal 64 is provided at a position where, when the right controller 4 is attached to the main body apparatus 2, the right controller 4 is made contact with the right terminal 21 (FIG. 3) of the main body apparatus 2.

Further, the right controller 4 includes a second L-button 65 and a second R-button 66, as with the left controller 3. These buttons 65 and 66 are used to give instructions related to various programs executed by the main body apparatus 2, as with the operation buttons 53 to 56.

The right controller 4 includes a notification LED 67. The notification LED 67 is a notification section for notifying the user of predetermined information, as with the notification LED 45 of the left controller 3.

The right controller 4 includes a pairing button 69. The pairing button 69 is used to give an instruction to perform a setting (also referred to as "pairing") process for wireless communication between the right controller 4 and the main body apparatus 2, and an instruction to perform a process for resetting the right controller 4.

It should be noted that, in the left controller 3 and the right controller 4, each of the components (specifically, sliders, sticks, buttons, etc.) provided in or on the housing 11 or 51 has any suitable shape, number, and arrangement. For example, in another example, the left controller 3 and the right controller 4 may include a direction input section that is different from an analog stick. Further, the slider 40 or 62 may be provided at a position corresponding to the position of the rail member 15 or 19 provided on the main body apparatus 2, e.g., the main surface or the back surface of the housing 31 or 51. Further, in another example, the left controller 3 and the right controller 4 may not have some of the above components.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be implemented as electronic parts on an electronic circuit board, which is accommodated in the housing 11.

The main body apparatus 2 includes a central processing unit (CPU) 81. The CPU 81 is an information processing section for executing various types of information processing to be executed by the main body apparatus 2. Strictly speaking, the CPU 81 may be a system-on-a-chip (SoC) having a plurality of functions such as a CPU function, a graphics processing unit (GPU) function, and the like. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a dynamic random access memory (DRAM) 85 as examples of internal storage media built into the main body apparatus 2. The flash memory 84 and the DRAM 85 are coupled to the CPU 81. The flash memory 84 is a memory mainly used to store various data (or programs) to be saved in the main body apparatus 2. The DRAM 85 is a memory used to temporarily store various data used for information processing.

The main body apparatus 2 includes a first slot interface (hereinafter abbreviated to "I/F") 91. The slot I/F 91 is coupled to the CPU 81. The slot I/F 91 is coupled to the slot 23, and in accordance with instructions from the CPU 81, reads and writes data from and to the first type of storage medium (e.g., an SD card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is coupled to the CPU 81. The network communication section 82 communicates (specifically, through wireless communication) with an external apparatus via a network. In this example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to transmit and receive data.

The main body apparatus 2 includes a controller communication section 83. The controller communication section 83 is coupled to the CPU 81. The controller communication section 83 wirelessly communicates with the left controller 3 and/or the right controller 4. The main body apparatus 2 may communicate with the left controller 3 and the right controller 4 using any suitable communication method. In this example, the controller communication section 83 performs communication compliant with the Bluetooth (registered trademark) standard with the left controller 3 and with the right controller 4.

The CPU 81 is coupled to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in this example, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user or users can simultaneously provide inputs to the main body apparatus 2 using a plurality of left controllers 3 and a plurality of right controllers 4.

The main body apparatus 2 includes a touch panel controller 86 which is a circuit for controlling the touch panel 13. The touch panel controller 86 is coupled between the touch panel 13 and the CPU 81. Based on a signal from the touch panel 13, the touch panel controller 86 generates, for example, data indicating a position where a touch input has been performed. The touch panel controller 86 outputs the data to the CPU 81.

Further, the display 12 is coupled to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is coupled to the speakers 88 and a audio input/output terminal 25 and also coupled to the processor 81. The codec circuit 87 is a circuit for controlling the input and output of sound data to and from the speakers 88 and the audio input/output terminal 25.

Further, the main body apparatus 2 includes an acceleration sensor 89. In this example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this example, the angular velocity sensor 90 detects angular velocities about predetermined three axes (e.g., the x-, y-, and z-axes shown in FIG. 1). It should be noted that the angular velocity sensor 90 may detect an angular velocity about one axis or angular velocities about two axes.

The acceleration sensor 89 and the angular velocity sensor 90 are coupled to the CPU 81, and the detection results of the acceleration sensor 89 and the angular velocity sensor 90 are output to the processor 81. Based on the detection results of the acceleration sensor 89 and the angular velocity sensor 90, the CPU 81 can calculate information regarding the motion and/or the orientation of the main body apparatus 2. It should be noted that, in this exemplary embodiment, an acceleration sensor and an angular velocity sensor are used as inertial sensors for calculating a motion, an orientation, and/or a position of the main body apparatus 2. In another exemplary embodiment, other sensors may be used.

The main body apparatus 2 includes a power control section 97 and a battery 98. The power control section 97 is coupled to the battery 98 and the CPU 81. Further, although not shown, the power control section 97 is coupled to components of the main body apparatus 2 (specifically, components that receive power supplied from the battery 98, the left terminal 17, and the right terminal 21). Based on a command from the CPU 81, the power control section 97 controls the supply of power from the battery 98 to the above components. Further, the power control section 97 is coupled to the power button 28. The power control section 97 controls the supply of power to each section based on an input to the power button 28. That is, when an operation of turning off is performed on the power button 28, the power control section 97 stops supplying power to all or a portion of the above sections. When an operation of turning on is performed on the power button 28, the power control section 97 starts supplying power all or a portion of the above sections. Further, the power control section 97 outputs information indicating an input to the power button 28 (specifically, information indicating whether or not the power button 28 has been pressed down) to the CPU 81.

Further, the battery 98 is coupled to the lower terminal 27. When an external charging device (e.g., the cradle) is coupled to the lower terminal 27, and power is supplied to the main body apparatus 2 via the lower terminal 27, the battery 98 is charged with the supplied power.

Figure 7:
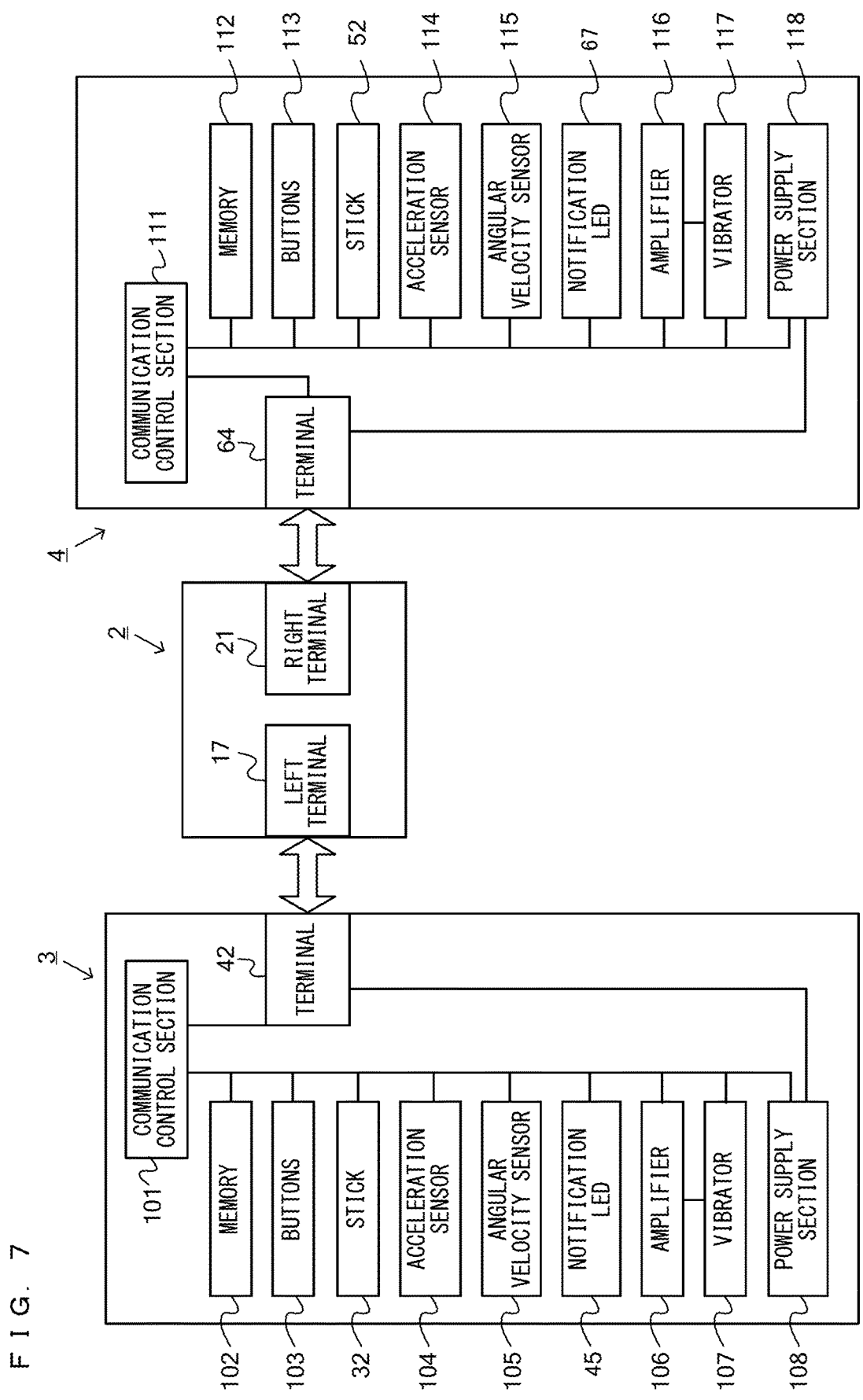
FIG. 7 is an example non-limiting block diagram showing the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are not shown in FIG. 7.

The left controller 3 includes a communication control section 101 which communicates with the main body apparatus 2. As shown in FIG. 7, the communication control section 101 is coupled to components including the terminal 42. In this example, the communication control section 101 can communicate with the main body apparatus 2 through both wired communication via the terminal 42 and wireless communication without using the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In this example, the acceleration sensor 104 detects the magnitudes of accelerations along predetermined three axial (e.g., x-, y-, and z-axes shown in FIG. 4) directions. It should be noted that the acceleration sensor 104 may detect an acceleration along one axial direction or accelerations along two axial directions. In this example, the angular velocity sensor 105 detects angular velocities about predetermined three axes (e.g., the x-, y-, and z-axes shown in FIG. 4). It should be noted that the angular velocity sensor 105 may detect an angular velocity about one axis or angular velocities about two axes. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations performed on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

Further, the notification LED 45 is coupled to the communication control section 101. In this exemplary embodiment, the notification LED 45 is controlled in accordance with a command from the main body apparatus 2. That is, the communication control section 101, when receiving the command from the main body apparatus 2, outputs a control signal for performing control to turn on the notification LED 45, to the notification LED 45, in accordance with the command.

The left controller 3 includes a vibrator 107 for giving notification to the user by a vibration. In this example, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes an amplifier 106. The communication control section 101, when receiving the above command, outputs a control signal corresponding to the command to the amplifier 106. The amplifier 106 amplifies the control signal from the communication control section 101 to generate a driving signal for driving the vibrator 107, and outputs the drive signal to the vibrator 107. Thus, the vibrator 107 is operated.

The left controller 3 includes a power supply section 108. In this example, the power supply section 108 includes a battery and a power control circuit. Although not shown, the power control circuit is coupled to the battery and also coupled to components of the left controller 3 (specifically, components that receive power supplied from the battery). The power control circuit controls the supply of power from the battery to each of the above sections. Further, the battery is coupled to the terminal 42. In this example, when the left controller 3 is attached to the main body apparatus 2, the battery is charged with power supplied from the main body apparatus 2 via the terminal 42, under predetermined conditions.

As shown in FIG. 7, the right controller 4 includes a communication control section 111 which communicates with the main body apparatus 2. Further, the right controller 4 includes a memory 112 which is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through either wired communication via the terminal 64 or wireless communication without using the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

The notification LED 67 of the right controller 4 operates in a manner similar to that of the notification LED 45 of the left controller 3. That is, the communication control section 111, when receiving a command from the main body apparatus 2, outputs a control signal for performing control to turn on the notification LED 67, to the notification LED 67, in accordance with the command.

Further, the right controller 4 includes a vibrator 117 and an amplifier 116. The vibrator 117 and the amplifier 116 operate in manners similar to those of the vibrator 107 and the amplifier 106 of the left controller 3. That is, the communication control section 111 operates the vibrator 117 using the amplifier 116 in accordance with a command from the main body apparatus 2.

The right controller 4 includes a power supply section 118. The power supply section 118 has a function similar to that of the power supply section 108 of the left controller 3, and operates in a similar manner. That is, the power supply section 118 controls the supply of power from the battery to each of sections that need power. Further, when the right controller 4 is attached to the main body apparatus 2, the battery is charged with power supplied from the main body apparatus 2 via the terminal 64, under predetermined conditions.

Figure 8:
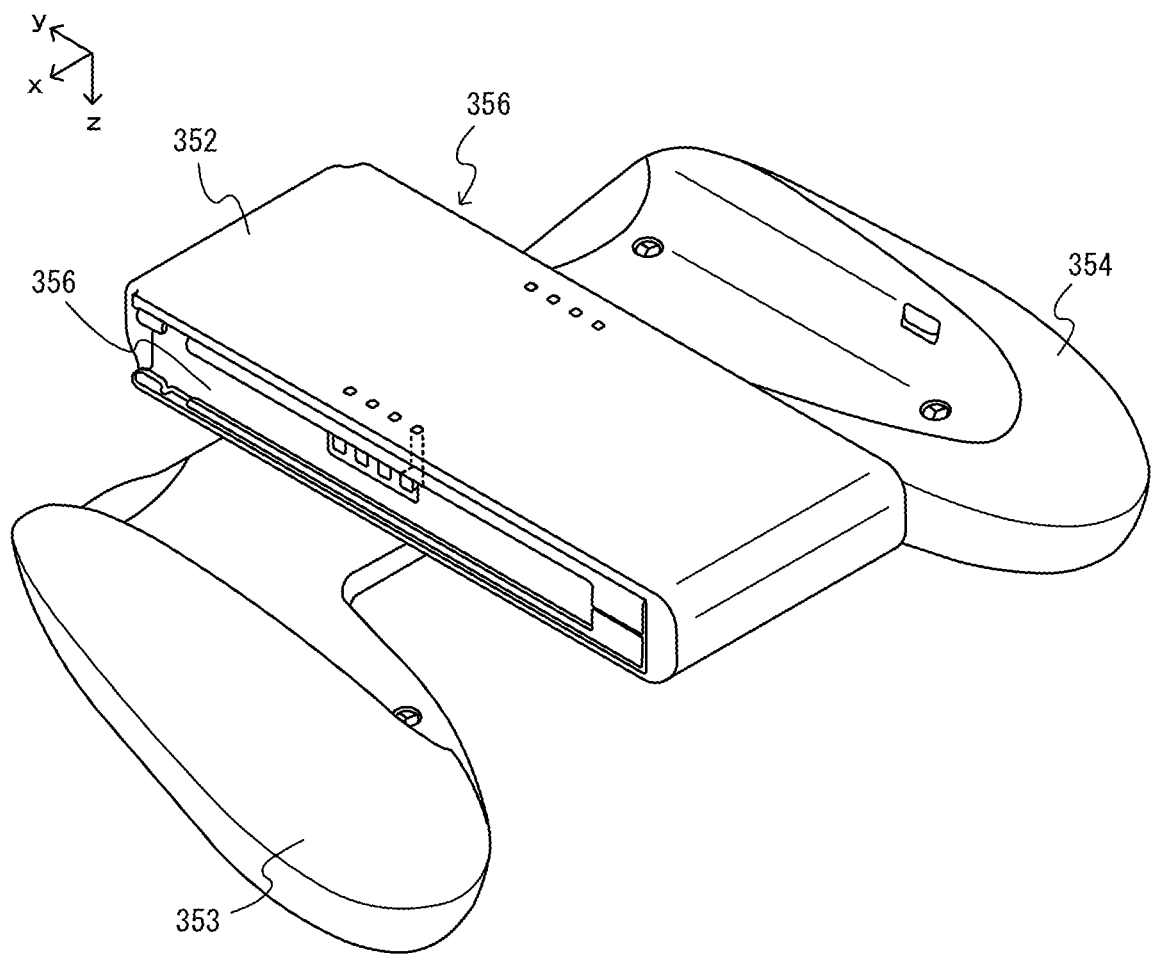
FIG. 8 is an example non-limiting diagram showing an accessory device to which the left controller 3 and the right controller 4 can be attached.
Figure 9:
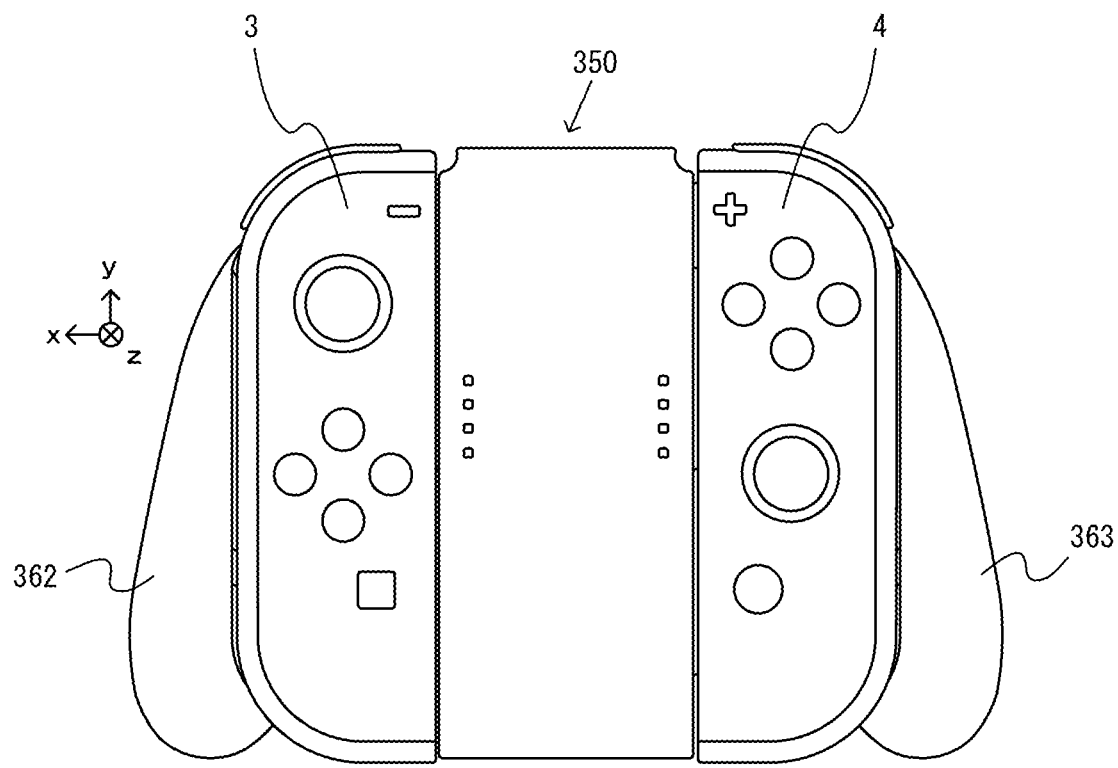
FIG. 9 is an example non-limiting diagram showing a state in which the left controller 3 and the right controller 4 are attached to the accessory device.

It should be noted that the controllers 3 and 4 detached from the main body apparatus 2 may be attached to an accessory device. FIG. 8 is an example non-limiting diagram showing an example of an accessory device to which the left controller 3 and the right controller 4 can be attached. FIG. 9 is an example non-limiting diagram showing an example of a state in which the left controller 3 and the right controller 4 are attached to the accessory device.

As shown in FIG. 8, the accessory device has a support portion 352, a left grip portion 353 that is to be held by the user using the left hand, and a right grip portion 354 which is to be held by the user using the right hand. Further, as shown in FIG. 8, a left rail member 356 that is to be slidably engaged with the slide portion provided on the right side surface of the left controller 3, is provided on a left side surface of the support portion 352. Similarly, a right rail member 356 that is to be engaged with the slide portion provided on the left side surface of the right controller 4, is provided on a right side surface of the support portion 352. The left rail member 356 allows the left controller 3 to slide in the negative direction of the y-axis of FIG. 8, so that the left controller 3 is fastened on the left side of the support portion 352 (see FIG. 9). Further, the right rail member 356 allows the right controller 4 to slide in the negative direction of the y-axis of FIG. 8, so that the right controller 4 is fastened on the right side of support portion 352 (see FIG.

9). Thus, by using the controllers 3 and 4 as attached to the accessory device, the user can feel as if the user operated a controller that is supposed to be held by both hands.

(Game Control Using Each Controller)

In this exemplary embodiment, the user plays a predetermined game using the information processing system 1. For example, in the game, the user moves a player character P that is displayed on the display 12 of the main body apparatus 2, in a game space, and causes the player character P to fight against a predetermined enemy character. It should be noted that, in this exemplary embodiment, the user can play the game alone, or together with one or more other users. When the user plays the game alone, the user causes their own player character P to move in the game space or fight against an enemy character (non-player character) that is controlled by the main body apparatus 2. When a plurality of users play the game, a plurality of main body apparatuses 2 communicate with each other (e.g., wireless communication, communication through a LAN, or communication through the Internet), and the users operate their own player characters to fight against each other.

In this exemplary embodiment, the user can perform game operations (e.g., operations for causing the player character P to move or fight against an enemy character, etc.) using the left controller 3 and the right controller 4 as attached to the main body apparatus 2. Further, the user can also perform game operations using the left controller 3 and the right controller 4 as detached from the main body apparatus 2.

Figure 10:
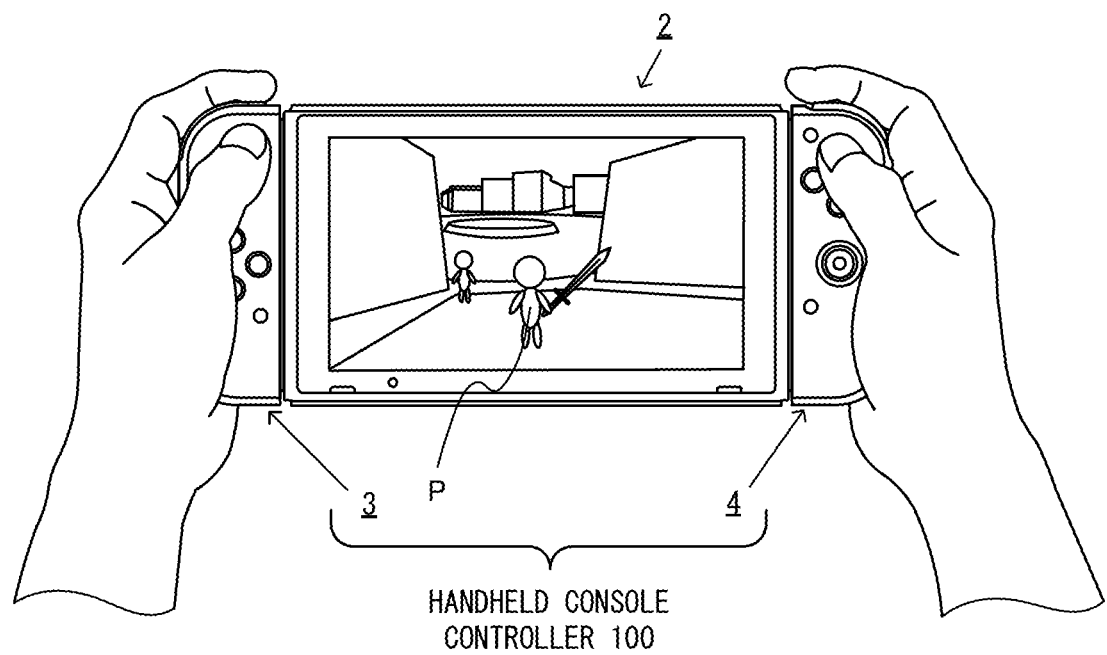
FIG. 10 is an example non-limiting diagram showing a situation where a game is played using the left controller 3 and the right controller 4 as attached to the main body apparatus 2.

FIG. 10 is an example non-limiting diagram showing an example of a situation where the game is played using the left controller 3 and the right controller 4 as attached to the main body apparatus 2 (this state is referred to as an "attached state"). As shown in FIG. 10, when the controllers 3 and 4 are both attached to the main body apparatus 2, the information processing system 1 can be used as a handheld device (e.g., a handheld game console).

In the attached state, the main body apparatus 2 communicates with each of the controllers 3 and 4 through wired communication (i.e., communication via terminals of the apparatuses connected to each other). That is, the main body apparatus 2 receives operation data from each of the controllers 3 and 4 as attached thereto, and performs a game process based on the received operation data.

It should be noted that, in another exemplary embodiment, in the attached state, the main body apparatus 2 may communicate with each of the controllers 3 and 4 through wireless communication. That is, in a situation where the left controller 3 and the right controller 4 are attached to the main body apparatus 2, the main body apparatus 2 may communicate with the left controller 3 wirelessly without using the terminals 17 and 42, and the main body apparatus 2 may communicate with the right controller 4 wirelessly without using the terminals 21 and 64.

In this exemplary embodiment, as shown in FIG. 10, a pair of the left controller 3 and the right controller 4 as attached to the main body apparatus 2 is referred to as a "handheld console controller 100." That is, the left controller 3 and the right controller 4 as unified with the main body apparatus 2 is referred to as a "handheld console controller 100." In this exemplary embodiment, the user can perform game operations using the left controller 3 and the right controller 4 as attached to the main body apparatus 2 as a single handheld console controller 100.

FIG. 11 is an example non-limiting diagram showing an example of a situation where the game is played using the left controller 3 and the right controller 4 as detached from the main body apparatus 2 (this state is referred to as a "detached state").

In the detached state, the main body apparatus 2 communicates with each of the left controller 3 and the right controller 4 through wireless communication. That is, the main body apparatus 2 receives operation data from the left controller 3 and the right controller 4 as wirelessly connected thereto (pairing has been established), and performs a game process based on the received operation data.

Although FIG. 11 shows a situation where the left controller 3 and the right controller 4 as attached to the above accessory device are used, the left controller 3 and the right controller 4 may also each be used without being attached to the accessory device. That is, the left controller 3 may be held using the left hand of the user, and the right controller 4 may be held using the right hand of the user.

A pair of the left controller 3 and the right controller 4 as detached from the main body apparatus 2 and connected to the main body apparatus 2 through wireless communication (as shown in FIG. 11, the left controller 3 and the right controller 4 are attached to an accessory device, or the left controller 3 and the right controller 4 are separated from the main body apparatus 2 without being attached to an accessory device) is hereinafter referred to as a "wireless controller 300." In this exemplary embodiment, the user can perform game operations using the left controller 3 and the right controller 4 as separated from the main body apparatus 2, as a single wireless controller 300.

Figure 12:
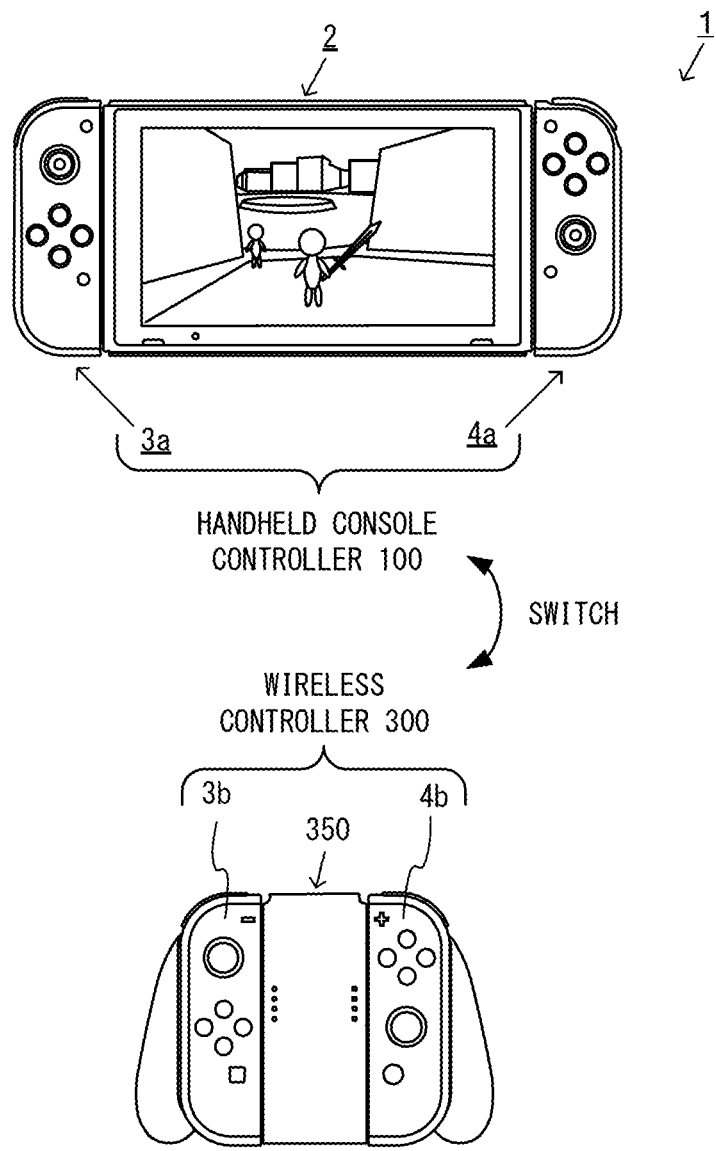
FIG. 12 is an example non-limiting diagram showing an example of the information processing system 1 in which the main body apparatus 2 is connected to a handheld console controller 100 and a wireless controller 300 at the same time.

Here, the main body apparatus 2 can be connected to the handheld console controller 100 and the wireless controller 300 at the same time. FIG. 12 is an example non-limiting diagram showing an example of the information processing system 1 in which the main body apparatus 2 is connected to the handheld console controller 100 and the wireless controller 300 at the same time.

As shown in FIG. 12, when the handheld console controller 100 (the left controller 3a and the right controller 4a) is connected to the main body apparatus 2, the wireless controller 300 (the left controller 3b and the right controller 4b) can be wirelessly connected to the main body apparatus 2. It should be noted that one of the handheld console controller 100 and the wireless controller 300 may be connected to the main body apparatus 2 before the other. Alternatively, the handheld console controller 100 and the wireless controller 300 may be connected to the main body apparatus 2 at the same timing.

As shown in FIG. 12, when the handheld console controller 100 and the wireless controller 300 are connected to the main body apparatus 2, the user can decide to use which of the two controllers the user is to use, i.e., can switch between the handheld console controller 100 and the wireless controller 300.

Specifically, one of the handheld console controller 100 and the wireless controller 300 is active, and operation data from that active controller (100 or 300) can be used in a game process. In this case, operation data performed on the inactive controller may be obtained in the main body apparatus 2, and may not be used in a game process. Alternatively, limitation may be placed so that at least a portion of operation data performed on the inactive controller may not be obtained in the main body apparatus 2 until that controller is active. A controller operation data from which is used in a game process is hereinafter referred to as an "active controller." Further, it is assumed that the active controller is used by the user to play a game. In this exemplary embodiment, when the main body apparatus 2 is connected to the handheld console controller 100 and the wireless controller 300, a controller on which a predetermined button has been most recently operated is active, and operations performed on the active controller are used in a game.

More specifically, when the user presses down a predetermined button, a controller having the predetermined button pressed down is set to "active." For example, when any of the buttons (specifically, the operation buttons 33 to 36, the first L-button 38, the ZL-button 39, the "−" button 47, the operation buttons 53 to 56, the "+" button 57, the first R-button 60, and the ZR-button 61), except for the analog sticks 32 and 52, the record button 37, and the home button 58, of the handheld console controller 100 is pressed down, the handheld console controller 100 is set to "active." Similarly, for example, any of the buttons (specifically, the operation buttons 33 to 36, the first L-button 38, the ZL-button 39, the "−" button 47, the operation buttons 53 to 56, the "+" button 57, the first R-button 60, and the ZR-button 61), except for the analog sticks 32 and 52, the record button 37, and the home button 58, of the wireless controller 300 is pressed down, the wireless controller 300 is set to "active."

It should be noted that when the record button 37 or the home button 58 is pressed down, a controller having the button pressed down may be set to "active."

Thus, the user can decide which of the handheld console controller 100 and the wireless controller 300 the user is to use, only by pressing down any of the predetermined buttons (33 to 36, 38, 39, 53 to 56, 57, 60, and 61) of the controller 100 or 300. The user can seamlessly switch between the two controllers 100 and 300, during execution of a game.

It should be noted that, in this exemplary embodiment, instead of the wireless controller 300 including the left controller 3 and the right controller 4, another wireless controller may be connected to the main body apparatus 2.

Figure 14:
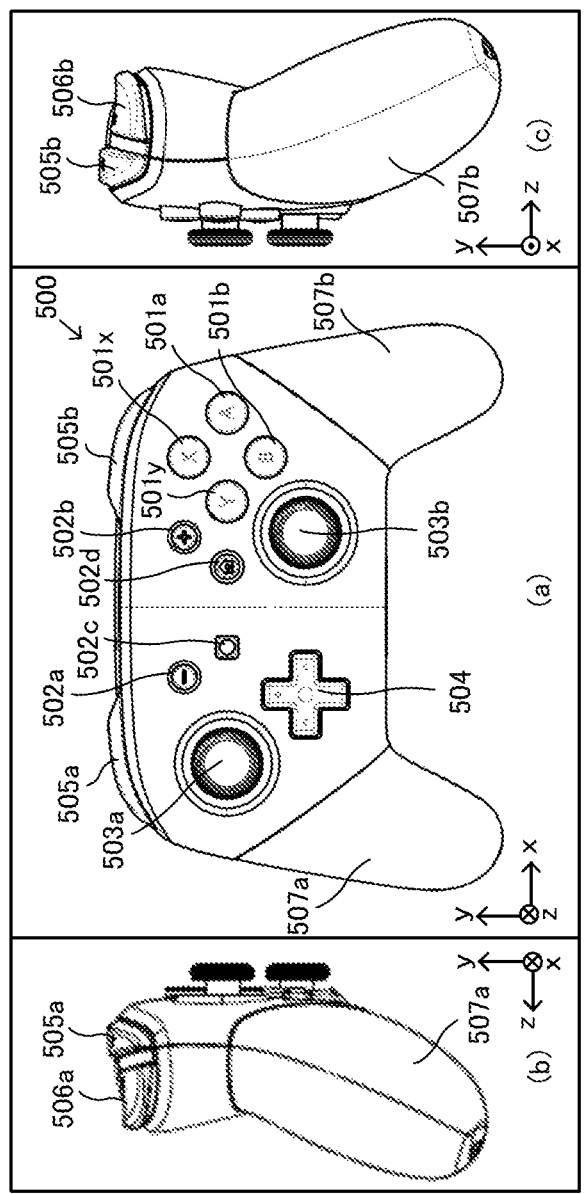
FIG. 14 is an example non-limiting diagram showing an example of the wireless controller 500.

FIG. 13 is an example non-limiting diagram showing an example of a situation where a single wireless controller 500 is connected to the main body apparatus 2 instead of the wireless controller 300 including the left controller 3 and the right controller 4. FIG. 14 is an example non-limiting diagram showing an example of the wireless controller 500.

As shown in FIG. 14, provided are an A-button 501a, a B-button 501b, an X-button 501x, a Y-button 501y, a "−" button 502a, a "+" button 502b, a record button 502c, a home button 502d, an analog stick 503a, an analog stick 503b, and a directional pad 504 on a front surface of the wireless controller 500. Further, provided are an L-button 505a, a ZL-button 506a, an R-button 505b, and a ZR-button 506b on an upper surface of the wireless controller 500.

The directional pad 504 includes a "right" key, a "down" key, an "up" key, and a "left" key. The "right" key, the "down" key, the "up" key, and the "left" key of the directional pad 504 correspond to the "right" button 33, the "down" button 34, the "up" button 35, and the "left" button 36, respectively, of the left controller 3. Further, the "−" button 502a, the record button 502c, the L-button 505a, and the ZL-button 506a correspond to the "−" button 47, the record button 37, the first L-button 38, and the ZL-button 39, respectively, of the left controller 3. Further, the analog stick 503a corresponds to the analog stick 32 of the left controller 3.

Further, the A-button 501a, the B-button 501b, the X-button 501x, and the Y-button 501y correspond to the A-button 53, the B-button 54, the X-button 55, and the Y-button 56, respectively, of the right controller 4. Further, the "+" button 502b, the home button 502d, the R-button 505b, and the ZR-button 506b correspond to the "+" button 57, the home button 58, the first R-button 60, and the ZR-button 61, respectively, of the right controller 4. Further, the analog stick 503b corresponds to the analog stick 52 of the right controller 4. The analog sticks 503a and 503b are an input section that can input a direction and a magnitude corresponding to the tilt direction and the tilt amount of a stick member, and provide an input by pressing down the stick member, as with the analog sticks 32 and 52.

Further, although not shown, the wireless controller 500 includes an acceleration sensor and an angular velocity sensor. Further, a left grip portion 507a which is held by the left hand of the user may include a vibrator, and a right grip portion 507b which is held by the right hand of the user may include a vibrator. Further, the wireless controller 500 includes a wireless communication module for wirelessly communicating with the main body apparatus 2. Further, the wireless controller 500 includes a battery.

Thus, the wireless controller 500 has functions similar to those of the wireless controller 300 (the left controller 3 and the right controller 4). That is, the wireless controller 500 has buttons corresponding to the buttons of the wireless controller 300, and analog sticks corresponding to the analog sticks of the wireless controller 300, and also inertial sensors (an acceleration sensor and an angular velocity sensor) as with the wireless controller 300. Therefore, the user can perform game operations similar to those of the wireless controller 300 (and those of the handheld console controller 100) using the wireless controller 500. It should be noted that the left controller 3 and the right controller 4 each include an inertial sensor, and thereby allow for operations to move their housings separately. In contrast to this, the wireless controller 500 is a single controller, and the right and left housings cannot be separately moved. Therefore, the wireless controller 500 includes only one inertial sensor.

In this exemplary embodiment, as shown in FIG. 13, when the handheld console controller 100 and the wireless controller 500 are connected to the main body apparatus 2, the user can also decide which of these two controllers the user is to use, i.e., can switch between the handheld console controller 100 and the wireless controller 500.

(Operation Data Output from Each Controller)

Figure 15:
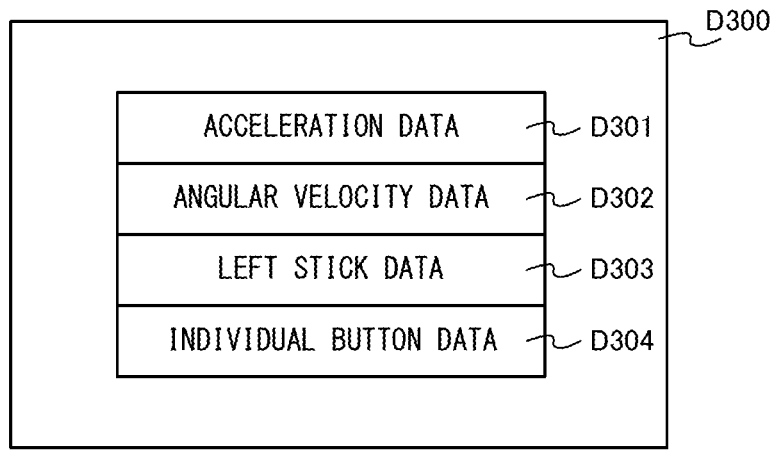
FIG. 15 is an example non-limiting diagram showing an example of operation data output from the left controller 3.
Figure 16:
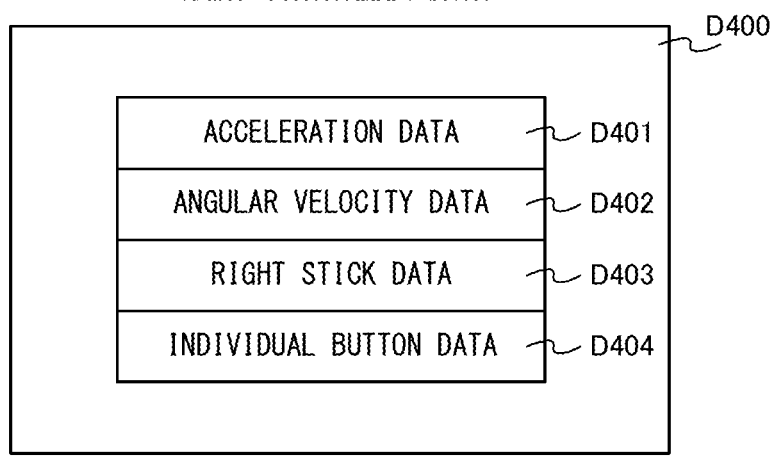
FIG. 16 is an example non-limiting diagram showing an example of operation data output from the right controller 4.

Next, operation data output from each controller will be described. The operation data from these controllers is obtained by the main body apparatus 2, and stored in memory such as the DRAM 85 or the like. FIG. 15 is an example non-limiting diagram showing an example of operation data output from the left controller 3. FIG. 16 is an example non-limiting diagram showing an example of operation data output from the right controller 4.

As shown in FIG. 15, operation data D300 output from the left controller 3 includes acceleration data D301, angular velocity data D302, left stick data D303, and individual button data D304. The operation data D300 of FIG. 15 is output from the left controller 3 to the main body apparatus 2 at predetermined time intervals (e.g., intervals of 1/200 sec). It should be noted that either when the left controller 3 is included in the handheld console controller 100, or when the left controller 3 is included in the wireless controller 300, the operation data D300 of FIG. 15 is output to the main body apparatus 2.

The acceleration data D301 indicates a value of an acceleration detected by the acceleration sensor 104. The angular velocity data D302 indicates a value of an angular velocity detected by the angular velocity sensor 105.

The left stick data D303, which is related to an operation performed on the analog stick 32, includes data indicating a direction corresponding to the tilt direction of the stick member, and data indicating the tilt amount of the stick member. Further, as described above, the analog stick 32 is an input section that can provide an input by pressing down the stick member. The left stick data D303 also includes data indicating whether or not a press input has been performed on the analog stick 32.

The individual button data D304 includes data (data indicating "on" or "off") indicating whether or not an operation has been performed on each button of the left controller 3. For example, the individual button data D304 includes data indicating whether or not the operation buttons 33 to 36 have been pressed down, data indicating whether or not the record button 37 has been pressed down, data indicating whether or not the first L-button 38 has been pressed down, data indicating whether or not the ZL-button 39 has been pressed down, and data indicating whether or not the "−" button 47 has been pressed down.

Further, as shown in FIG. 16, operation data D400 output from the right controller 4 includes acceleration data D401, angular velocity data D402, right stick data D403, and individual button data D404. The operation data D400 of FIG. 16 is output from the right controller 4 to the main body apparatus 2 at predetermined time intervals (e.g., intervals of 1/200 sec). It should be noted that either when the right controller 4 is included in the handheld console controller 100, or when the right controller 4 is included in the wireless controller 300, the operation data D300 of FIG. 16 is output to the main body apparatus 2.

The acceleration data D401 indicates a value of an acceleration detected by the acceleration sensor 114. The angular velocity data D402 indicates a value of an angular velocity detected by the angular velocity sensor 115.

The right stick data D403, which is related to an operation performed on the analog stick 52, includes data indicating a direction corresponding to the tilt direction of the stick member, and data indicating the tilt amount of the stick member. Further, as described above, the analog stick 52 is an input section that can provide an input by pressing down the stick member. The right stick data D403 also includes data indicating whether or not a press input has been performed on the analog stick 52.

The individual button data D404 includes data (data indicating "on" or "off") indicating whether or not an operation has been performed on each button of the right controller 4. For example, the individual button data D404 includes data indicating whether or not the operation buttons 53 to 56 have been pressed down, data indicating whether or not the home button 58 has been pressed down, data indicating whether or not the first R-button 60 has been pressed down, data indicating whether or not the ZR-button 61 has been pressed down, and data indicating whether or not the "+" button 57 has been pressed down.

(Operation Data from Wireless Controller 500)

Although not shown, when the wireless controller 500 is connected to the main body apparatus 2, the wireless controller 500 outputs operation data similar to the above operation data output from the left controller 3 and the right controller 4. Specifically, the operation data from the wireless controller 500 includes acceleration data indicating an acceleration detected by the acceleration sensor of the wireless controller 500, angular velocity data indicating an angular velocity detected by the angular velocity sensor of the wireless controller 500, left stick data related to an operation performed on the analog stick 503*a*, right stick data related to an operation performed on the analog stick 503*b*, and individual button data.

(Operation Data Related to Operations Detected by Main Body Apparatus)

Figure 17:
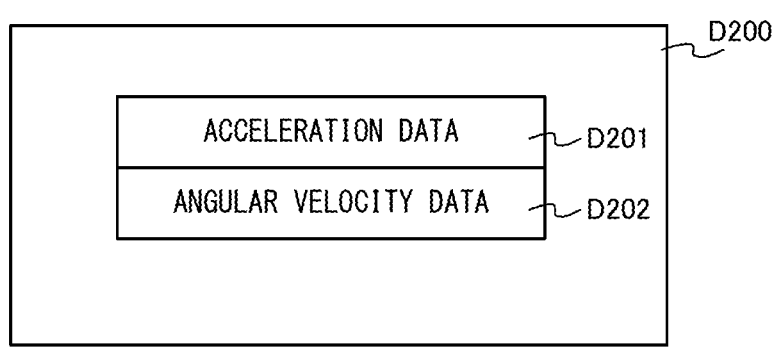
FIG. 17 is an example non-limiting diagram showing an example of operation data D200 related to a user's operations detected by the main body apparatus 2.

Next, operation data related to the user's operations detected by the main body apparatus 2 will be described. FIG. 17 is an example non-limiting diagram showing an example of the operation data D200 related to the user's operations detected by the main body apparatus 2. As shown in FIG. 17, the operation data D200 includes acceleration data D201 and angular velocity data D202. It should be noted that the operation data D200 related to the user's operations detected by the main body apparatus 2 may not be limited to those shown in FIG. 17, and may include other data (e.g., touch data indicating the location of touches detected by the touch panel 13, etc.).

The acceleration data D201 indicates the value of an acceleration detected by the acceleration sensor 89. The angular velocity data D202 indicates the value of an angular velocity detected by the angular velocity sensor 90.

(Details of Process by Main Body Apparatus)

Next, a process performed by the main body apparatus 2 will be described in detail. FIG. 18 is an example non-limiting flowchart showing an example of the process performed in the main body apparatus 2. The process of FIG. 18 is performed by the CPU 81 of the main body apparatus 2 executing a predetermined program (e.g., a game program).

As shown in FIG. 18, the CPU 81 initially executes a controller connection process (step S1). Here, the CPU 81 performs a process of connecting the main body apparatus 2 and the handheld console controller 100, and a process of connecting the main body apparatus 2 and the wireless controller 300 (or the wireless controller 500).

It should be noted that, in the description that follows, a case is described where the handheld console controller 100 including the left controller 3*a* and the right controller 4*a* is connected to the main body apparatus 2, and the wireless controller 300 including the left controller 3*b* and the right controller 4*b* is connected to the main body apparatus 2.

Specifically, in step S1, the CPU 81 determines whether or not the left controller 3*a* and the right controller 4*a* are connected to the main body apparatus 2 through a wire (i.e., the terminal 42 of the left controller 3*a* is connected to the left terminal 17 of the main body apparatus 2, and the terminal 64 of the right controller 4*a* is connected to the right terminal 21 of the main body apparatus 2). If the CPU 81 determines that both of the left controller 3*a* and the right controller 4*a* are connected to the main body apparatus 2 through a wire, the CPU 81 recognizes the left controller 3*a* and the right controller 4*a* as the handheld console controller 100, and ends the process of connecting the main body apparatus 2 and the handheld console controller 100. Further, in step S1, the CPU 81 performs a process of checking a wireless connection between the wireless controller 300 and the main body apparatus 2. Specifically, the CPU 81 determines whether or not a wireless connection has been established between the main body apparatus 2 and the left controller 3*b* for which paring has been performed. Further, the CPU 81 determines whether or not a wireless connection has been established between the main body apparatus 2 and the right controller 4*b* for which paring has been performed. If the CPU 81 determines that a wireless connection has been established between the main body apparatus 2 and the left controller 3*b*, and that a wireless connection has been established between the main body apparatus 2 and the right controller 4*b*, the CPU 81 recognizes the left controller 3*b* and the right controller 4*b* as the wireless controller 300, and ends the process of connecting between the main body apparatus 2 and the wireless controller 300. It should be noted that if any other wireless controller is not connected to the main body apparatus 2, then when a pair of the left controller 3b and the right controller 4b is recognized as a single wireless controller 300, the first one of four LEDs of the notification LED 45 in the left controller 3b is turned on, and the first one of four LEDs of the notification LED 67 in the right controller 4b is turned on. Further, the CPU 81 recognizes a pair of the left controller 3b and the right controller 4b as a single wireless controller 300 no matter whether or not the left controller 3b and the right controller 4b are fastened together by an accessory device.

As used here, the term "a wireless connection has been established" means that the process of wirelessly connecting two apparatuses has been completed (e.g., an authentication process has been performed, or information for identifying each apparatus has been exchanged), i.e., a state in which one-to-one communication is allowed. For example, when a wireless connection has been established between the main body apparatus 2 and the left controller 3, one-to-one communication is allowed between the main body apparatus 2 and the left controller 3.

Following step S1, the CPU 81 sets one of the two controllers 100 and 300 thus connected to "active" (step S2). For example, when the main body apparatus 2 is connected to both of the handheld console controller 100 and the wireless controller 300, the CPU 81 may set the handheld console controller 100 to "active." Alternatively, when the main body apparatus 2 is connected to both of the handheld console controller 100 and the wireless controller 300, the CPU 81 may set one controller connected after (or before) the other to "active." Further, the CPU 81 may set one controller selected by the user to "active." It should be noted that when the main body apparatus 2 is connected to only one of the handheld console controller 100 and the wireless controller 300, the connected controller is set to "active." In the description that follows, a case is described where the main body apparatus 2 is connected to both of the handheld console controller 100 and the wireless controller 300. Even in a case where the main body apparatus 2 is connected to only one of the handheld console controller 100 and the wireless controller 300 before the main body apparatus 2 is additionally connected to the other, a similar process is performed after the main body apparatus 2 has been connected to both of the handheld console controller 100 and the wireless controller 300.

Following step S2, the CPU 81 obtains operation data (step S3). Specifically, the CPU 81 obtains operation data output from the handheld console controller 100, and operation data output from the wireless controller 300. It should be noted that the CPU 81 repeatedly executes step S3 and following steps at predetermined time intervals (e.g., intervals of 1/60 sec).

Following step S3, based on the operation data from the two controllers 100 and 300, the CPU 81 determines whether or not a predetermined button of the handheld console controller 100 or the wireless controller 300 has been operated (step S4). Specifically, based on the operation data from the handheld console controller 100, the CPU 81 determines whether or not a predetermined button (e.g., any of the buttons 33 to 36, the first L-button 38, the ZL-button 39, the "−" button 47, the buttons 53 to 56, the first R-button 60, the ZR-button 61, and the "+" button 57) of the handheld console controller 100 has been pressed down. Further, based on the operation data from the wireless controller 300, the CPU 81 determines whether or not a predetermined button (e.g., any of the buttons 33 to 36, the first L-button 38, the ZL-button 39, the "−" button 47, the buttons 53 to 56, the first R-button 60, the ZR-button 61, and the "+" button 57) of the wireless controller 300 has been pressed down. It should be noted that when the stick member of the analog stick 32 or 52 is tilted, the CPU 81 does not determine that a predetermined button has been operated, and meanwhile, when an input is provided by pressing down the stick member of the analog stick 32 or 52, the CPU 81 may determine that a predetermined button has been operated. Further, even when an input is provided by pressing down the stick member of the analog stick 32 or 52, the CPU 81 may not determine that a predetermined button has been operated.

If the CPU 81 determines that a predetermined button of the handheld console controller 100 or the wireless controller 300 has been operated (step S4: YES), the CPU 81 determines whether or not the controller having the operated predetermined button is currently active (step S5).

If the determination result of step S5 is negative (NO), the CPU 81 sets the controller having the operated predetermined button to "active" (step S6). That is, based on the operation data most recently obtained, the CPU 81 sets one of the handheld console controller 100 and the wireless controller 300 that has the operated predetermined button, to "active."

It should be noted that the CPU 81 may detect an operation performed on a predetermined button for both of the handheld console controller 100 and the wireless controller 300. In this case, the CPU 81 may keep active one controller that is currently active. Further, in this case, the CPU 81 may set one controller that is not currently active, to "active." Further, in this case, the CPU 81 may set one controller for which the number of buttons that have been operated or the number of times a predetermined button has been operated is greater, to "active." Further, in this case, the CPU 81 may set one of the controllers to "active" with higher priority.

If the determination result of step S5 is positive (YES), if the execution of step S6 is done, or if the determination result of step S4 is negative (NO), the CPU 81 performs a game process based on operation data (step S7). Step S7 is described in detail below.

Following step S7, the CPU 81 generates an image based on a game process, and displays the image on a display (step S8). Specifically, the CPU 81 generates an image of the game space as viewed from a virtual camera provided therein, and displays the image on the display 12. After step S8, control returns to step S3.

Steps S3 to S8 are repeatedly performed at predetermined time intervals (e.g., intervals of 1/60 sec), whereby a game process is performed in accordance with an operation performed on the handheld console controller 100 or the wireless controller 300. An image as a result of the game process is displayed on a display. Steps S4 to S6 are performed during execution of a game process, and therefore, a controller operated by the user can be seamlessly switched between the handheld console controller 100 and the wireless controller 300. It should be noted that when the game is ended (e.g., the user gives an instruction to end the game, a predetermined time limit has expired, etc.), the CPU 81 ends steps S3 to S8, so that the process of FIG. 18 is ended.

(Game Process Based on Operation Data)

Figure 19:
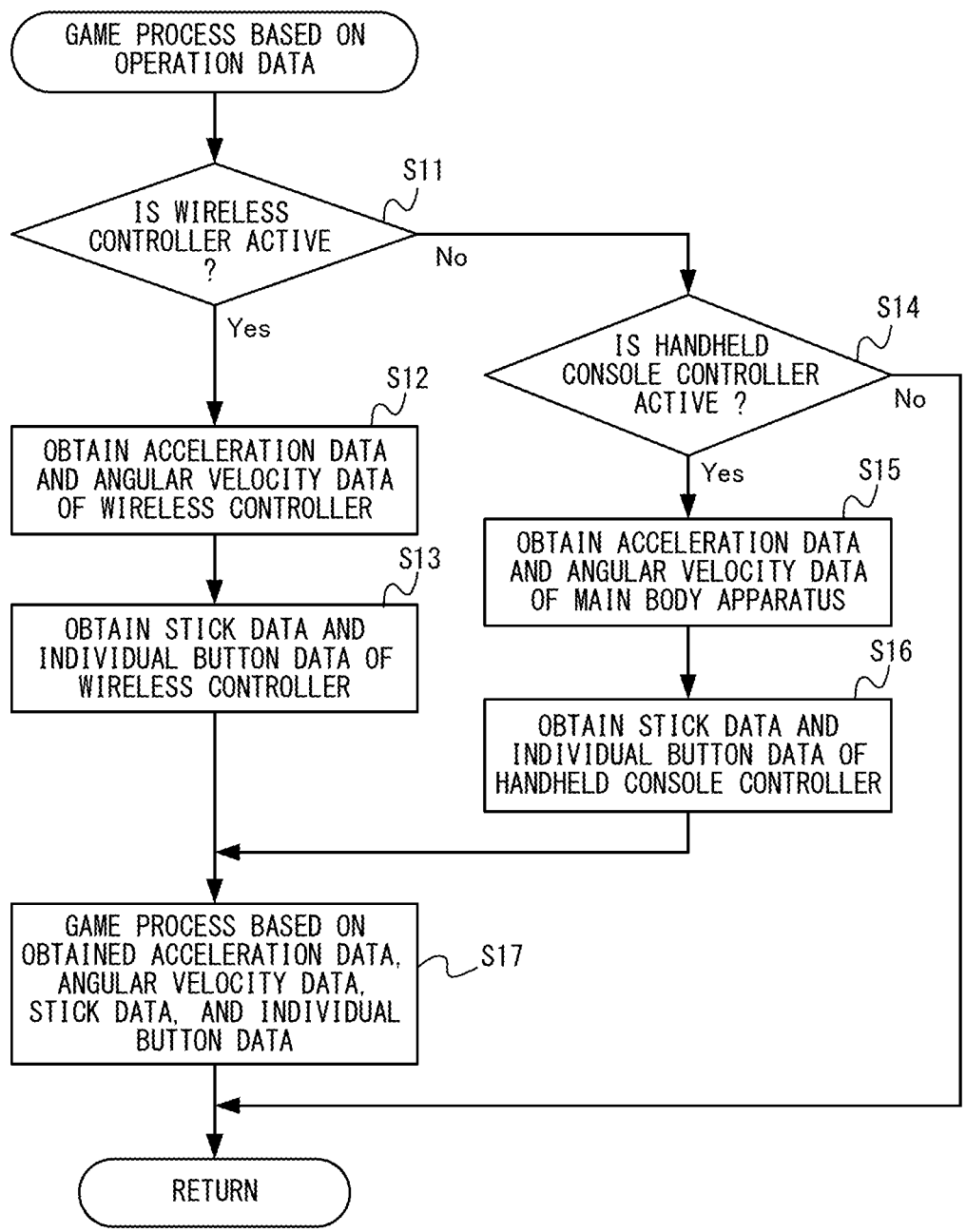
FIG. 19 is an example non-limiting flowchart showing an example of a game process based on operation data in step S7 of FIG. 18.

Next, the game process based on the operation data in step S7 of FIG. 18 will be described in detail with reference to FIG. 19. FIG. 19 is an example non-limiting flowchart showing an example of the game process based on the operation data in step S7 of FIG. 18.

As shown in FIG. 19, the CPU 81 determines whether or not the wireless controller 300 is currently active (step S11).

If the CPU 81 determines that the wireless controller 300 is active (step S11: YES), the CPU 81 obtains acceleration data and angular velocity data of operation data output from the wireless controller 300 (step S12). Specifically, the CPU 81 reads the acceleration data D401 and the angular velocity data D402 that are output from the right controller 4b included in the wireless controller 300, and stored in a memory.

Following step S12, the CPU 81 obtains the left stick data D303, the individual button data D304, the right stick data D403, and the individual button data D404 of operation data from the wireless controller 300 (step S13).

Meanwhile, if the CPU 81 determines that the wireless controller 300 is not active (step S11: NO), the CPU 81 determines whether or not the handheld console controller 100 is active (step S14).

If the CPU 81 determines that the handheld console controller 100 is active (step S14: YES), the CPU 81 obtains the acceleration data D201 and the angular velocity data D202 of the main body apparatus 2 (step S15).

Following step S15, the CPU 81 obtains the left stick data D303, the individual button data D304, the right stick data D403, and the individual button data D404 of operation data from the handheld console controller 100 (step S16).

Following step S13 or step S16, the CPU 81 performs a game process based on the obtained acceleration data, angular velocity data, stick data, and individual button data (step S17). That is, when executing step S17, following step S13, the CPU 81 performs a game process based on the data obtained in step S12 and the data obtained in step S13. Meanwhile, when executing step S17, following step S16, the CPU 81 performs a game process based on the data obtained in step S15 and the data obtained in step S16.

For example, in step S17, the CPU 81 moves the player character P in the game space based on the left stick data. Further, the CPU 81 changes the line-of-sight direction of the virtual camera in the game space based on the right stick data. Further, for example, the CPU 81 causes the player character P to attack an enemy character based on the individual button data. For example, when the ZR-button 61 of the handheld console controller 100 or the wireless controller 300 is pressed down, the player character P may perform an action to shoot an enemy character using a gun. Further, for example, when the A-button 53 is pressed down, the player character P may perform an action to attack an enemy character using a sword.

Further, in step S17, the CPU 81 calculates the orientation of the main body apparatus 2 as unified with the wireless controller 300 or the orientation of the handheld console controller 100 based on the obtained acceleration data and/or angular velocity data, and controls the line-of-sight direction of the virtual camera based on the calculated orientation. Specifically, when the wireless controller 300 is active, the CPU 81 calculates how much the wireless controller 300 has been rotated about the x-, y-, and z-axis of FIG. 9, based on data from the angular velocity sensor of the right controller 4b in the wireless controller 300, to determine the orientation of the wireless controller 300. In this case, the CPU 81 may correct the calculated orientation based on data from the acceleration sensor of the right controller 4b. Thereafter, the CPU 81 sets the line-of-sight direction of the virtual camera in the game space based on the calculated orientation. For example, the CPU 81 sets the line-of-sight direction of the virtual camera to a direction that coincides with a direction in which the back surface of the wireless controller 300 faces. Further, when the handheld console controller 100 is active, the CPU 81 calculates the orientation of the main body apparatus 2 as unified with the handheld console controller 100, based on data from the acceleration sensor and the angular velocity sensor of the main body apparatus 2, and sets the line-of-sight direction of the virtual camera based on the calculated orientation. It should be noted that when the wireless controller 500 is active, a similar process is performed. That is, when the wireless controller 500 is active, the CPU 81 calculates the orientation of the wireless controller 500 based on data from the acceleration sensor and the angular velocity sensor of the wireless controller 500, and sets the line-of-sight direction of the virtual camera based on the calculated orientation.

As can be seen from the foregoing, a game process is performed based on operation data (stick data, individual button data, acceleration data, and angular velocity data) from a currently active controller. When the wireless controller 300 is active, a game process is performed using individual button data and stick data from the wireless controller 300, and data output from the acceleration sensor and the angular velocity sensor of the right controller 4b included in the wireless controller 300. Meanwhile, when the handheld console controller 100 is active, a game process is performed using individual button data and stick data from the handheld console controller 100, and data output from the acceleration sensor and the angular velocity sensor of the main body apparatus 2. That is, when the handheld console controller 100 is active, data output from the acceleration sensor and the angular velocity sensor of the handheld console controller 100 (the left controller 3a and the right controller 4a) is not used in a game process. It should be noted that the orientation of an inactive controller may also be internally calculated without affecting the displayed contents of a game, and when the currently active controller is switched to that controller, may be immediately used for the game.

It should be noted that when the wireless controller 300 is active, a game process may be performed using data output from the acceleration sensor and the angular velocity sensor of the left controller 3b, or data output from the acceleration sensors and the angular velocity sensors of both of the controllers 3b and 4b. Further, when the handheld console controller 100 is active, a game process may be performed using data output from the acceleration sensor and the angular velocity sensor of one of the left controller 3a and the right controller 4a included in the handheld console controller 100, or data output from the acceleration sensors and the angular velocity sensors of both of the left controller 3a and the right controller 4a.

Following step S17, the CPU 81 ends the process of FIG. 19, and control returns to the process of FIG. 18.

It should be noted that if the determination result of step S14 is negative (NO), i.e., the CPU 81 determines that none of the wireless controller 300 and the handheld console controller 100 is active, the process of FIG. 19 is ended.

It should be noted that the above process is merely for illustrative purposes. Alternatively, for example, some or all of the steps may be performed in other orders, other steps may be added, or some of the steps may be removed.

For example, although step S7 is performed after step S6 in FIG. 18, step S8 may be performed after step S6. That is, in FIG. 18, when the controllers are switched in step S6, step S7 is immediately executed. Therefore, when the controllers are switched, the operation of switching the controllers also affects a game process. That is, when a predetermined button of an inactive controller is pressed down, the controllers are switched so that the controller the predetermined button of which has been pressed down is set to "active," and a game process is performed based on the pressing down of the predetermined button.

Meanwhile, when step 8 is performed after step S6 in FIG. 18, the controllers are only switched in the current process loop, and the operation of switching the controllers does not affect a game process. That is, the controllers are switched by the first button operation performed by the user, and a game process is performed by the second operation and following operations.

Thus, in this exemplary embodiment, one of the handheld console controller 100 and the wireless controller 300 that has been most recently operated by the user is set to "active," and a game process is performed based on operation data output from the active controller.

For example, when the two controllers 100 and 300 are connected to the main body apparatus 2, then if the CPU 81 performs a game process based on operation data from both of the controllers, an unexpected operation may be input, and this may lead to an unexpected reaction. For example, if it is assumed that a single user plays a game using one of the handheld console controller 100 and the wireless controller 300, there may be some operations that cannot be executed by the user, and such operations that cannot be executed may not be expected for a game program. For example, two different directions cannot be simultaneously input using a single stick, and the two values of an inertial sensor cannot be simultaneously input. However, in a game for which it is assumed that a single user plays a game using one of the handheld console controller 100 and the wireless controller 300, when, for example, two users operate the handheld console controller 100 and the wireless controller 300, respectively, an operation that cannot be executed by a single user can be input, and a reaction that is unexpected for a game program may be generated.

However, in this exemplary embodiment, only one of the handheld console controller 100 and the wireless controller 300 is set to "activate," and operations performed on the active controller are used in a game process, and therefore, it is not necessary to assume the above unexecutable operations.

Further, for inputs to buttons, it is possible to distinguish between "on" and "off." Inputs to sticks and outputs from sensors always have a certain value. Therefore, it is difficult to determine whether or not such an input performed by a user is intentional. In this exemplary embodiment, operation data from an active controller is used, and therefore, only data of a controller that is being used by the user affects a game.

For example, the acceleration sensor 114 and the angular velocity sensor 115 of the right controller 4 each always detect a physical quantity (an acceleration value and an angular velocity value). Therefore, the right controller 4 outputs an acceleration value and an angular velocity value at each detection timing to the main body apparatus 2. Therefore, for example, even when the right controller 4 is not being moved by the user, these physical quantities are output. For example, even when the right controller 4 is still, these physical quantities are detected (gravity is detected as an acceleration in the still state), and are output from the right controller 4 to the main body apparatus 2. Further, even when the right controller 4 is not being moved by the user, then if, for example, any force is applied to the right controller 4 (e.g., an environment in which the controller is placed is moving, etc.), these physical quantities are detected and output to the main body apparatus 2. That is, even when the user is not operating a controller, an acceleration sensor and an angular velocity sensor detect an acceleration value and an angular velocity value. Therefore, it is difficult for the main body apparatus 2 to determine whether or not the user is intentionally operating a controller (whether or not the user is actually using the controller), based on outputs from an acceleration sensor and an angular velocity sensor. However, in this exemplary embodiment, such determination is performed based on the presence or absence of an input to a button, and therefore, it is easy to determine which controller is being used by the user. Further, only outputs from the acceleration sensor and the angular velocity sensor of a controller that is being used by the user, can affect a game process.

(Controller Selection Process)

In the foregoing, a process has been described which is performed when the handheld console controller 100 and the wireless controller 300 are connected to the main body apparatus 2. The main body apparatus 2 of this exemplary embodiment can be connected to a plurality of wireless controllers. For example, the main body apparatus 2 may be connected to the wireless controller 500 in addition to the wireless controller 300 including the left controller 3*b* and the right controller 4*b*. Further, the main body apparatus 2 may be connected to a wireless controller 301 including a left controller 3*c* and a right controller 4*c* in addition to the wireless controller 300 including the left controller 3*b* and the right controller 4*b*.

Specifically, the main body apparatus 2 repeatedly performs a process of establishing a wireless connection to a wireless controller in addition to the processes of FIGS. 18 and 19. For example, when the handheld console controller 100 and the wireless controller 300 are connected to the main body apparatus 2, then if the wireless controller 500 of FIG. 13 attempts to wirelessly connect to the main body apparatus 2, the main body apparatus 2 can establish a wireless connection to the wireless controller 500 in response to the attempt. For example, when the user is playing a game while the handheld console controller 100 and the wireless controller 300 are connected to the main body apparatus 2, then if the amount of charge remaining in the battery of the wireless controller 300 is small, the user may desire to use the wireless controller 500 instead of the wireless controller 300. In this case, when the user presses down a button of the wireless controller 500, the wireless controller 500 attempts to wirelessly connect to the main body apparatus 2. In response to the attempt of the wireless controller 500 to wirelessly connect to the main body apparatus 2, the main body apparatus 2 establishes a wireless connection to the wireless controller 500. When a wireless connection has been established between the main body apparatus 2 and the wireless controller 500, the main body apparatus 2 is connected to the two wireless controllers 300 and 500 in addition to the handheld console controller 100.

In the description that follows, a process will be described that is performed by the main body apparatus 2 when a plurality of wireless controllers are connected to the main body apparatus 2.

Figure 20:
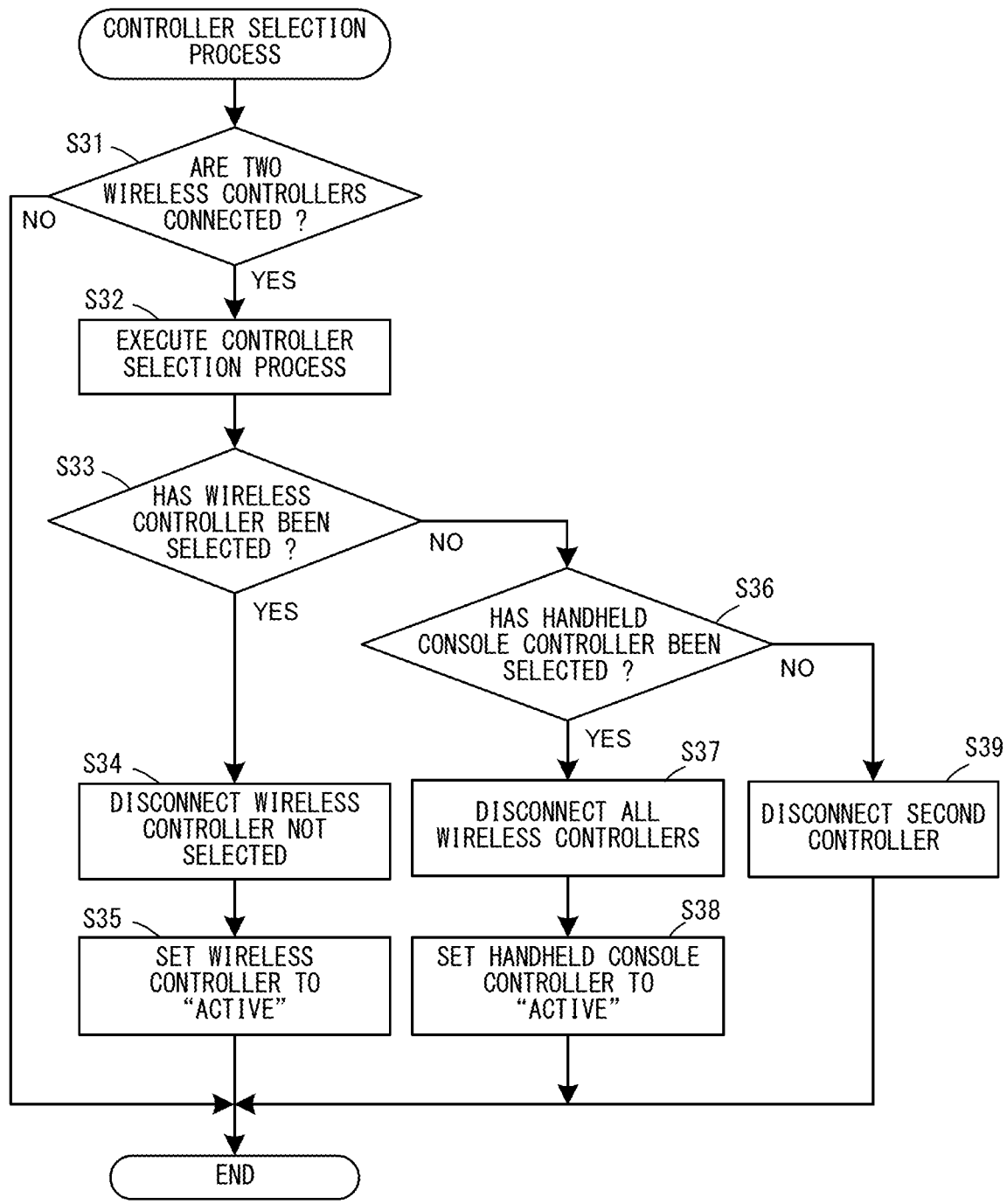
FIG. 20 is an example non-limiting diagram showing an example of a selection process of selecting a controller to be used in a game when two wireless controllers are wirelessly connected to the main body apparatus 2.

FIG. 20 is an example non-limiting diagram showing an example of a selection process of selecting a controller to be used in a game when two wireless controllers are wirelessly connected to the main body apparatus 2. The CPU 81 executes a predetermined program to perform the process of FIG. 20. It should be noted that the CPU 81 repeatedly executes the process of FIG. 20 at predetermined time intervals (e.g., intervals of 1/60 sec).

As shown in FIG. 20, the CPU 81 initially determines whether or not the two wireless controllers are wirelessly connected to the main body apparatus 2 (step S31). If the two wireless controllers are not both connected to the main body apparatus 2 (step S31: NO), the CPU 81 ends the process of FIG. 20.

Meanwhile, if the CPU 81 determines that the two wireless controllers are wirelessly connected to the main body apparatus 2 (step S31: YES), the CPU 81 executes the controller selection process (step S32). Here, the controller selection process in step S32 will be described, assuming that the main body apparatus 2 is connected to the handheld console controller 100, the wireless controller 300, and the wireless controller 500.

Specifically, in step S32, the CPU 81 generates an image indicating information about the currently connected controllers (the handheld console controller 100, the wireless controller 300, and the wireless controller 500), and in addition, an image for allowing the user to select a controller, and outputs the images to the display 12. For example, the CPU 81 generates an image that prompts the user to hold a controller that the user desires to use, and press down the L-button and the R-button thereof. When the selection screen is displayed, the user selects one of the controllers (the handheld console controller 100, the wireless controller 300, and the wireless controller 500) by pressing down the L-button and the R-button of the controller that the user desires to use.

If a wireless controller has been selected in the controller selection process of step S32 (step S33: YES), the CPU 81 disconnects a wireless connection to a wireless controller that is not selected (step S34). For example, when the main body apparatus 2 is connected to the wireless controller 300 and the wireless controller 500 as wireless controllers, then if the wireless controller 300 has been selected by the user in step S32, the CPU 81 disconnects a wireless connection to the wireless controller 500 that has not been selected by the user. Thereafter, the CPU 81 sets the wireless controller 300 selected by the user to "active" (step S35), and ends the process of FIG. 20.

Meanwhile, if the handheld console controller 100 has been selected in the controller selection process of step S32 (step S33: NO, and step S36: YES), the CPU 81 disconnects a wireless connection to all of the wireless controllers (300 and 500) (step S37). Thereafter, the CPU 81 sets the handheld console controller 100 selected by the user to "active" (step S38), and ends the process of FIG. 20.

If none of the controllers has been selected in the controller selection process of step S32 (step S36: NO), the CPU 81 disconnects a wireless connection to the second earliest wireless controller that has been established (step S39). For example, if the user has given an instruction to cancel the controller selection process in the controller selection process of step S32, the CPU 81 executes step S39. If step S39 has been executed, the CPU 81 ends the process of FIG. 20. Further, when the user has not selected any of the controllers and a predetermined period of time has elapsed, the CPU 81 executes step S39. In this case, when the predetermined period of time has not yet elapsed, control returns to step S32.

It should be noted that when two wireless controllers 300 are wirelessly connected to the main body apparatus 2, the controller selection process is performed in accordance with the process of FIG. 20. Further, this is true for when two controllers 500 are wirelessly connected to the main body apparatus 2.

It should be noted that the above process is merely for illustrative purposes. Alternatively, for example, some or all of the steps may be performed in other orders, other steps may be added, or some of the steps may be removed.

Thus, a wireless connection is disconnected for a wireless controller that has not been selected by the user. As a result, power consumption can be reduced. It should be noted that when the user operates again a wireless controller for which a wireless connection has been disconnected, the wireless controller attempts to connect to the main body apparatus 2, so that a wireless connection is established between the wireless controller and the main body apparatus 2 again.

As described above, the information processing system of this exemplary embodiment includes the main body apparatus 2, the handheld console controller 100 as attached to the main body apparatus 2, and a wireless controller (300 or 500) that is wirelessly connected to the main body apparatus 2. One of the handheld console controller 100 and the wireless controller (300 or 500), a predetermined button of which has been most recently operated, is set to "active," so that a game process is performed based on operation data related to operations performed on the active controller.

That is, a game process is performed based on an operation performed on one of the wireless controller (300 or 500) wirelessly connected to the main body apparatus 2 (in other words, separated from the main body apparatus 2) and the handheld console controller 100 unified with the main body apparatus 2, that has been most recently operated by the user. The main body apparatus 2 performs a game process based on operation data received from the controller that has been most recently operated. Meanwhile, even when the main body apparatus 2 receives operation data from any controller other than the controller that has been most recently operated by the user, the main body apparatus 2 does not perform a game process based on that received operation data.

As a result, two controllers (100 and 300) can be seamlessly switched. For example, the user can switch from the wireless controller 300 to the handheld console controller 100 by pressing down a predetermined button of the handheld console controller 100 while performing a game using the wireless controller 300.

Further, in this exemplary embodiment, a game process is performed based on operation data from one of the handheld console controller 100 and a wireless controller (300 or 500) connected to the main body apparatus 2, but not based on operation data from the other controller. Therefore, even when operation data is output from a controller that is not being operated by the user, the operation data from that controller does not affect a game process, and therefore, only operation data from the controller that is being operated by the user can affect a game process. For example, when the main body apparatus 2 and the handheld console controller 100 unified with the main body apparatus 2 are present in an environment that is rotating or moving (e.g., they are present in a moving vehicle, or a table on which they are placed is moving), the orientations of the main body apparatus 2 and the handheld console controller 100 are changed without the user's operation. In such a situation, for example, when the user is performing game operations while holding the wireless controller 300, then if the orientation of the main body apparatus 2 is changed, and the change in the orientation affects a game process, the line-of-sight direction of the virtual camera in the game space is changed even when the user does not move the wireless controller 300, for example.

However, in this exemplary embodiment, one of the handheld console controller 100 and a wireless controller (300 or 500) that has been clearly operated (by pressing down a predetermined button) in the main body apparatus 2 is set to "active," and only operation data from the active controller affects a game process. Therefore, the occurrence of an acceleration or an angular velocity that is not caused by the user's operation can be prevented from affecting a game process.

As used herein, the term "unified with a main body apparatus" includes, as in the above exemplary embodiment, a state in which the left and right controllers 3 and 4 that can be separated from the main body apparatus 2 are attached to the main body apparatus 2, and a state in which the left and right controllers 3 and 4 cannot be separated from the main body apparatus 2, i.e., is fixed to the main body apparatus 2. That is, the term "controller as unified with a main body apparatus" or the term "operation section as unified with a main body apparatus" means a controller or an operation section that is attached or fixed to the main body apparatus and is moved in association with the movement of the main body apparatus, including a separable controller as attached to the main body apparatus, and an operation section (an operation button provided on the housing of the main body apparatus, etc.) that is fixed to the main body apparatus. It should be noted that when a separable controller is attached and connected to a main body apparatus, the main body apparatus and the controller may communicate with each other in either a wired or wireless manner.

(Variations)

In the foregoing, the information processing system of this exemplary embodiment has been described. In other exemplary embodiments, the information processing system may have the following features.

For example, in this exemplary embodiment, when a wireless controller (300 or 500) is active, the orientation of the wireless controller is calculated based on data from an acceleration sensor and an angular velocity sensor (inertial sensors) provided in the wireless controller, and the virtual camera is set based on the calculated orientation. Further, when the handheld console controller is active, the operation of the handheld console controller (main body apparatus) is calculated based on data from an acceleration sensor and an angular velocity sensor (inertial sensors) provided in the main body apparatus, and the virtual camera is set based on the calculated orientation.

In another exemplary embodiment, for example, a camera may be used to detect the orientation of a controller. For example, when a wireless controller is active, an image of the surrounding area may be captured using a camera provided in the wireless controller, and the captured image may be analyzed to detect the orientation of the wireless controller. Alternatively, an image of a wireless controller may be captured using a camera provided around the wireless controller, and the captured image may be analyzed to detect the orientation of the wireless controller. This is true for when a handheld console controller is active. For example, when a handheld console controller is active, a camera provided in the handheld console controller, a camera provided in a main body apparatus, or a camera provided around the handheld console controller, may be used to capture an image, and the captured image may be analyzed to detect the orientation of the handheld console controller (main body apparatus).

Further, instead of the orientation of a controller, another state of the controller may be detected, and a game process may be performed based on the detected state. Further, in addition to setting of a virtual camera, any other suitable game process may be performed based on a state of a controller. Examples of a state of a controller include a location (e.g., a location detected using a GPS), a motion, an orientation, temperature, the amount of charge remaining in a battery, a state of communication, and the like of the controller. That is, the information processing system may be provided with a sensor for detecting a state of a handheld console controller, and a sensor for detecting a state of a wireless controller, and when the handheld console controller is active, a game process may be performed based on data from the sensor for detecting the state of the handheld console controller, and operations performed on buttons and an analog stick of the handheld console controller. Further, when the wireless controller is active, a game process may be performed based on data from the sensor for detecting the state of the wireless controller, and operations performed on buttons and an analog stick of the wireless controller.

Further, in this exemplary embodiment, a game process is performed based on an operation performed on a controller. Alternatively, in addition to a game process, in another exemplary embodiment, any other suitable information process may be performed.

Further, in this exemplary embodiment, a handheld console controller and a wireless controller is provided with a movable operation section (buttons and an analog stick) that can be moved by the user. In another exemplary embodiment, other operation sections may be provided. For example, a handheld console controller and a wireless controller may be provided with at least one of buttons, analog sticks, slide sticks (slide pads) that can be operated by being slid in a predetermined direction by the user, and touch panels.

Further, in this exemplary embodiment, when a predetermined button of a handheld console controller or a wireless controller is pressed down, the controllers are switched. When an analog stick of a handheld console controller or a wireless controller is operated by being tilted, the controllers are not be switched. This is because a stick member of the analog stick is configured to return to its original position (its vertically standing position) when no force is applied thereto, but the stick member may, in some cases, fail to return to its original position when no force is applied to the stick member.

In another exemplary embodiment, when an analog stick is operated by being tilted, the controllers may be switched. For example, when the tilt amount of the analog stick is greater than or equal to a predetermined value, a controller having the analog stick tilted by the predetermined value or more may be set to "active." Further, when a slide stick having a slidable stick member is used instead of an analog stick having a tiltable stick member, the controllers may be switched if the amount of a slide is greater than or equal to a predetermined value.

Further, when an analog stick is tilted, the controllers may not be switched. Meanwhile, when an input is provided by pressing down the analog stick, the controllers may be switched.

Further, in addition to an operation performed on a predetermined button or an analog stick of a handheld console controller and a wireless controller, when another operation is performed on a controller, the controller on which that operation has been performed may be set to "active." For example, the user may perform an input operation by a gesture operation. For example, a camera (e.g. an infrared camera or a visible light camera) provided in a controller may be used to capture an image of the user's hand, face, or the like, and when a gesture operation performed by the user is detected based on the captured image, the controller that has captured the image may be set to "active."

Further, in this exemplary embodiment, when two controllers (a handheld console controller and a wireless controller) are connected to the main body apparatus 2, one of the two controllers that has been most recently operated is set to "active." In another exemplary embodiment, three or more controllers (e.g., the handheld console controller 100, one or more wireless controllers 300, and one or more wireless controllers 500) may be connected to the main body apparatus 2, and one of the three or more controllers that has been most recently operated may be set to "active."

Further, in another exemplary embodiment, when a plurality of wireless controllers are connected to the main body apparatus 2, these wireless controllers may be switched in a manner similar to that described above. For example, when the wireless controller 300 and the wireless controller 500 are connected to the main body apparatus 2, and the wireless controller 300 is active, then if a predetermined button of the wireless controller 500 is pressed down, the wireless controller 500 may be set to "active."

Further, in this exemplary embodiment, it is assumed that the handheld console controller 100 is connected to the main body apparatus 2, and a wireless controller is connected to the main body apparatus 2. In another exemplary embodiment, even when a wireless connection has not been established between a wireless controller and the main body apparatus 2, the handheld console controller 100 and the wireless controller may be switched. Specifically, if the handheld console controller 100 is connected to the main body apparatus 2 and a wireless controller is not connected to the main body apparatus 2, then when a predetermined button of the wireless controller is pressed down, a process of connecting between the wireless controller and the main body apparatus 2 is performed, so that a wireless connection is established between the wireless controller and the main body apparatus 2. Thereafter, further, when a predetermined button of the wireless controller is pressed down, the wireless controller is set to "active," so that an information process (e.g., a game process) is performed based on an operation performed on the wireless controller. Thereafter, when a predetermined button of the handheld console controller 100 is pressed down, the handheld console controller 100 is set to "active," and an information process is performed based on an operation performed on the handheld console controller 100.

Further, in this exemplary embodiment, the left controller 3 and the right controller 4 as attached to the left and right sides of the main body apparatus 2 form the handheld console controller 100. In another exemplary embodiment, a handheld console controller may include one or three or more controllers, instead of the left and right controllers, i.e., two controllers. For example, the left controller 3 as attached to the left side of the main body apparatus 2 may serve as a handheld console controller, and the right controller 4 as detached from the main body apparatus 2 may serve as a wireless controller. Further, these handheld console controller and wireless controller may be switched in the method described above.

This exemplary embodiment has been described above. The description of this exemplary embodiment is merely for illustrative purposes, and various modifications and changes could be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
an information processing apparatus including a processor and a display;
a first control device; and
a second control device, wherein
the processor is configured to:
obtain operation data from the first control device and the second control device, one of the first control device and the second control device being an active control device and the other one of the first control device and the second control device being a not active control device;
determine, based on the obtained operation data, whether a first operation or a second operation is performed, the first operation comprising operation of a predetermined first input of the first control device and the second operation comprising operation of a predetermined second input of the second control device;
based on determining that the first operation is performed at a time when the second control device is the active control device of the first control device and the second control device, set the first control device to be the active control device of the first control device and the second control device;
based on determining that the second operation is performed at a time when the first control device is the active control device of the first control device and the second control device, set the second control device to be the active control device of the first control device and the second control device, and
perform an information process based on the operation data obtained from the active control device of the first control device and the second control device, but not on the operation data obtained from the not active control device of the first control device and the second control device, and wherein
the first control device remains set as the active control device of the first control device and the second control device until determining, based on the obtained operation data, that the second operation is performed, and
the second control device remains set as the active control device of the first control device and the second control device until determining, based on the obtained operation data, that the first operation is performed.

2. The information processing system according to claim 1, wherein
the first input and the second input each comprises a movable member configured for user operation,
the information processing system further comprises:
a first sensor configured to output first data indicative of a state of the first control device; and
a second sensor configured to output second data indicative of a state of the information processing apparatus, and
the processor is further configured to:
based on the first control device being identified as the active control device, performing the information process based on the operations of inputs of the first control device and the first data; and based on the second control device being identified as the active control device, performing the information process based on the operations of inputs of the second control device and the second data.

3. The information processing system according to claim 2, wherein
the first input and the second input each include, as the movable member, a pressible button, and a directional input configured for tilting or sliding.

4. The information processing system according to claim 2, wherein
the first sensor and the second sensor each include an inertial sensor, and
the first input and the second input each includes at least one of a pressible button, a directional input configured for tilting or sliding, or a touch panel.

5. The information processing system according to claim 1, wherein
the first control device and the second control device are each configured for selective attachment to and detachment from the information processing apparatus, and
the first control device and the second control device are each configured for wireless communication with the information processing apparatus when detached from the information processing apparatus.

6. The information processing system according to claim 5, wherein
the first control device and the second control device are configured for selective attachment to and detachment from opposite sides of the information processing apparatus.

7. The information processing system according to claim 2, wherein
the first sensor is provided in the first control device, and the second sensor is provided in the information processing apparatus.

8. The information processing system according to claim 1, wherein
the information processing apparatus, the first control device, and the second control device each includes an inertial sensor.

9. The information processing system according to claim 1, further comprising:
a third control device configured to wirelessly connect to the information processing apparatus,
wherein
the processor is configured to, based on the first control device and the third control device both being wirelessly connected to the information processing apparatus, allow user selection of one of the first control device, the second control device, and the third control device as the active control device.

10. The information processing system according to claim 9, wherein
the processor is configured to, based on one of the first control device or the third control device being selected as the active control device, control to disconnect from the other one of the first control device or the third control device.

11. A non-transitory computer-readable storage medium having stored therein an information processing program for execution by a computer of an information processing apparatus including a display, wherein
the information processing apparatus is configured for communication with a first control device and a second control device, and
the information processing program, when executed, causing the computer to execute at least:
obtaining operation data from the first control device and the second control device, one of the first control device and the second control device being an active control device and the other one of the first control device and the second control device being a not active control device;
determining based on the obtained operation data, whether a first operation or a second operation is performed, the first operation comprising operation of a predetermined first input of the first control device and the second operation comprising operation of a predetermined second input of the second control device;
based on determining that the first operation is performed at a time when the second control device is the active control device of the first control device and the second control device, setting the first control device to be the active control device of the first control device and the second control device;
based on determining that the second operation is performed at a time when the first control device is the active control device of the first control device and the second control device, setting the second control device to be the active control device of the first control device and the second control device; and
performing an information process based on the operation data obtained from the active control device of the first control device and the second control device; but not on the operation data obtained from the not active control device of the first control device and the second control device, and wherein
the first control device remains set as the active control device of the first control device and the second control device until determining, based on the obtained operation data, that the second operation is performed, and
the second control device remains set as the active control device of the first control device and the second control device until determining, based on the obtained operation data, that the first operation is performed.

12. The non-transitory computer-readable storage medium according to claim 11, wherein
the first input and the second input each comprises a movable member configured for user operation,
the information processing program, when executed, causes the computer to further execute:
obtaining data from a first sensor configured to output first data indicative of a state of the first control device, and data from a second sensor configured to output second data indicative of a state of the information processing apparatus,
based on the first control device being identified as the active control device, performing the information process based on the operations of inputs of the first control device and the first data; and
based on the second control device being identified as the active control device, performing the information process based on the operations of inputs of the second control device and the second data.

13. The non-transitory computer-readable storage medium according to claim 11, wherein
the information processing apparatus is configured to wirelessly connect to a third control device, and
the information processing program, when executed, causes the computer to further execute:

based on the first control device and the third control device both being wirelessly connected to the information processing apparatus, allow user selection of one of the first control device, the second control device, and the third control device as the active control device.

14. The non-transitory computer-readable storage medium according to claim 13, wherein
the information processing program, when executed, causes the computer to further execute:
based on one of the first control device or the third control device being selected as the active control device, disconnecting from the other one of the first control device or the third control device.

15. An information processing apparatus including a display, wherein
the information processing apparatus is configured to communicate with a first control device and a second control device, and
the information processing apparatus comprises a processor configured to:
obtain operation data from the first control device and the second control device, one of the first control device and the second control device being an active control device and the other one of the first control device and the second control device being a not active control device;
determine, based on the obtained operation data, whether a first operation or a second operation is performed, the first operation comprising operation of a predetermined first input of the first control device and, the second operation comprising operation of a predetermined second input of the second control device;
based on determining that the first operation is performed at a time when the second control device is the active control device of the first control device and the second control device, set the first control device to be the active control device of the first control device and the second control device;
based on determining that the second operation is performed at a time when the first control device is the active control device of the first control device and the second control device, set the second control device to be the active control device of the first control device and the second control device; and
performed an information process based on the operation data obtained from the active control device of the first control device and the second control device, but not on the operation data obtained from the not active control device of the first control device and the second control device, and wherein
the first control device remains set as the active control device of the first control device and the second control device until determining, based on the obtained operation data, that the second operation is performed, and
the second control device remains set as the active control device of the first control device and the second control device until determining, based on the obtained operation data, that the first operation is performed.

16. The information processing apparatus according to claim 15, wherein
the first input and the second input each comprises a movable member configured for user operation, and
the processor is further configured to:
obtain first data from a first sensor configured to sense a state of the first control device, and second data from a second sensor configured to sense a state of the information processing apparatus,
based on the first control device being identified as the active control device, performing the information process based on the operations of inputs of the first control device and the first data; and
based on the second control device being identified as the active control device, performing the information process based on the operations of inputs of the second control device and the second data.

17. The information processing apparatus according to claim 15, wherein
the information processing apparatus is configured to wirelessly connect to a third control device, and
the processor is further configured to:
based on the first control device and the third control device both being wirelessly connected to the information processing apparatus, allow user selection of one of the first control device, the second control device, and the third control device as the active control device.

18. The information processing apparatus according to claim 17, wherein
the processor is further configured to:
based on one of the first control device or the third control device being selected as the active control device, control to disconnect from the other one of the first control device and the third control device.

19. An information processing method for use in an information processing system including an information processing apparatus having a display, wherein
the information processing system includes:
a first control device; and
a second control device, and
the information processing method comprises:
obtaining operation data from the first control device and the second control device, one of the first control device and the second control device being an active control device and the other one of the first control device and the second control device being a not active control device;
determining, based on the obtained operation data, whether a first operation or a second operation is performed, the first operation comprising operation of a predetermined first input of the first control device and the second operation comprising operation of a predetermined second input of the second control device;
based on determining that the first operation is performed at a time when the second control device is the active control device of the first control device and the second control device, setting the first control device to be the active control device of the first control device and the second control device;
based on determining that the second operation is performed at a time when the first control device is the active control device of the first control device and the second control device, setting the second control device to be the active control device of the first control device and the second control device; and
performing an information process based on the operation data obtained from the active control device of the first control device and the second control device, but not on the operation data obtained from the not active control device of the first control device and the second control device, and wherein the first control device remains set as the active control device of the first control device and the second control device until determining, based on the obtained operation data, that the second operation is performed, and the second control device remains set as the active control device of the first control device and the second control device until determining, based on the obtained operation data, that the first operation is performed.

20. The information processing method according to claim 19, wherein the first input and the second input each comprises a movable member configured for user operation, and the information processing system further includes:
   a first sensor configured to output first data indicative of a state of the first control device; and
   a second sensor configured to output second data indicative of a state of the information processing apparatus, the information processing method further comprises:
   based on the first control device being identified as the active control device, performing the information process based on the operations of inputs of the first control device and the first data; and
   based on the second control device being identified as the active control device, performing the information process based on the operations of inputs of the second control device and the second data.

\* \* \* \* \*